INVENTOR.
WILLIAM D. VAN DYKE
BY
Dode N. Jeu
-AGENT-

INVENTOR.
WILLIAM D. VAN DYKE
BY
Dodd N. Jeu
- AGENT -

Nov. 3, 1970 W. D. VAN DYKE 3,538,264

ANNUNCIATOR SYSTEM WITH DIGITAL MEANS FOR SELECTING INDIVIDUAL MESSAGE ELEMENTS FOR THE SYNTHESIS OF AN AUDIO MESSAGE

Filed April 8, 1968 13 Sheets-Sheet 3

INVENTOR.
WILLIAM D. VAN DYKE
BY
Dale N. Jeu
- AGENT -

INVENTOR.
WILLIAM D. VAN DYKE
BY Dode N. Jew
-AGENT-

INVENTOR
WILLIAM D. VAN DYKE
BY [signature]
-AGENT-

INVENTOR.
WILLIAM D. VAN DYKE
BY
- AGENT -

Nov. 3, 1970 W. D. VAN DYKE 3,538,264

ANNUNCIATOR SYSTEM WITH DIGITAL MEANS FOR SELECTING INDIVIDUAL MESSAGE ELEMENTS FOR THE SYNTHESIS OF AN AUDIO MESSAGE

Filed April 8, 1968 13 Sheets-Sheet 7

INVENTOR.
WILLIAM D. VAN DYKE
BY
[signature]
-AGENT-

INVENTOR.
WILLIAM D. VAN DYKE
BY
[signature]
-AGENT-

INVENTOR.
WILLIAM D. VAN DYKE
BY
[signature]
- AGENT -

INVENTOR.
WILLIAM D. VAN DYKE
BY
Dodd N. Jeu
-AGENT-

INVENTOR.
WILLIAM D. VAN DYKE
BY
Dock N. Jeu
-AGENT-

INVENTOR.
WILLIAM D. VAN DYKE
BY
[signature]
- AGENT -

INVENTOR.
WILLIAM D. VAN DYKE
BY
Dode N. Jeu
-AGENT- 3,538,264

ANNUNCIATOR SYSTEM WITH DIGITAL MEANS FOR SELECTING INDIVIDUAL MESSAGE ELEMENTS FOR THE SYNTHESIS OF AN AUDIO MESSAGE

William D. Van Dyke, Palos Verdes Estates, Calif., assignor to McDonnell Douglas Corporation, a corporation of Maryland Filed Apr. 8, 1968, Ser. No. 719,322
Int. Cl. G08b *3/00, 21/00;* G11b *23/18*
U.S. Cl. 179—100.2 10 Claims

ABSTRACT OF THE DISCLOSURE

Annunciator system including recording and playback means having a plurality of channels containing respective groups of message elements recorded therein, converter means for providing a multiple order digital number representation which is variable according to a changeable parameter as aircraft altitude, each digit identifying a corresponding channel according to the digit value and the digit order identifying a corresponding message element of the group recorded in the channel, and electively operable means controlled according to such digital number for forming an unambiguous composite audio message from the identified channels and message elements. Manually settable means further produce automatic readouts at selected altitudes.

BACKGROUND OF THE INVENTION

My present invention relates generally to annunciator systems and more particularly to an annunciator system which is variably responsive in accordance with a changing parameter to produce audio readouts of the status or value of the parameter at any selected instant or condition.

Annunciation or warning systems have been commonly used in various structures and vehicles to announce or call attention to certain detected conditions which are usually potentially hazardous or dangerous. Originally, the announcement or warning was performed by a bell, horn, buzzer or the like. In a fire protection system for a building, for example, a bell may be made to ring and sound an alarm when a detector located within the building senses that the temperature of its surrounding area has reached or exceeded a predetermined level. Similarly, speed warning systems for automobiles may utilize a buzzer which is energized when the speedometer pointer reaches or exceeds a selected speed position setting.

Subsequently, where annunciation or warning was required for several different and important systems as in aircraft, it was found that a voice annunciation or warning system which provided different audio messages for the different systems was preferable to the use of several different sounding alarms. A voice message would immediately identify the system involved while calling attention to a dangerous or particular condition in the system. Of course, such voice annunciation systems would require means for determining the relative priority for the messages to be announced in the event of simultaneous occurrences of conditions requiring annunciation in two or more systems. Systems of this nature are shown, described and claimed in, for example, the Pat 2,804,501 of Victor B. Hart for Voice Warning Systems, patented on Aug. 27, 1957. These prior annunciation or warning systems were, however, limited to certain specific messages for certain particular conditions and were not versatile enough to provide voice messages which were responsively variable in accordance with a changing parameter, for example. Other limitations were also present in such prior systems.

SUMMARY OF THE INVENTION

Briefly, and in general terms, my invention is preferably accomplished by providing recording and playback means having a plurality of channels containing respective groups of message elements recorded therein, converter means which produces a multiple order digital representation that is variable in accordance with a changeable parameter, each digit identifying a corresponding channel according to the digit value and the order of the digit identifying a corresponding message element of the group recorded in the channel, and arbitrarily or continuously operable means responsive to such digital representation for forming a composite message or messages from the identified channels and message elements. A composite message deliverance or readout can be obtained electively or arbitrarily at any chosen time, and such composite message corresponds to the instantaneous status or condition of the variable digital representation at that time. Successive cyclic readouts can also be continuously obtained wherein each readout corresponds to the variable digital representation status or condition at the end of the previous readout. The invention includes anti-ambiguity means for preventing ambiguous readouts therefrom, and blanking means for automatically blanking out certain portions of a readout for certain digit orders of the digital representation or as elected. The invention further includes automatic readout means for providing automatic readouts, if desired, at any selected conditions of the digital representation.

BRIEF DESCRIPTION OF THE DRAWINGS

My invention will be more fully understood, and other features and advantages thereof will become apparent, from the following description of certain exemplary embodiments of the invention. The description is to be taken in conjunction with the accompanying drawings, in which.

DESCRIPTION OF THE PRESENT EMBODIMENTS

Figure 1:
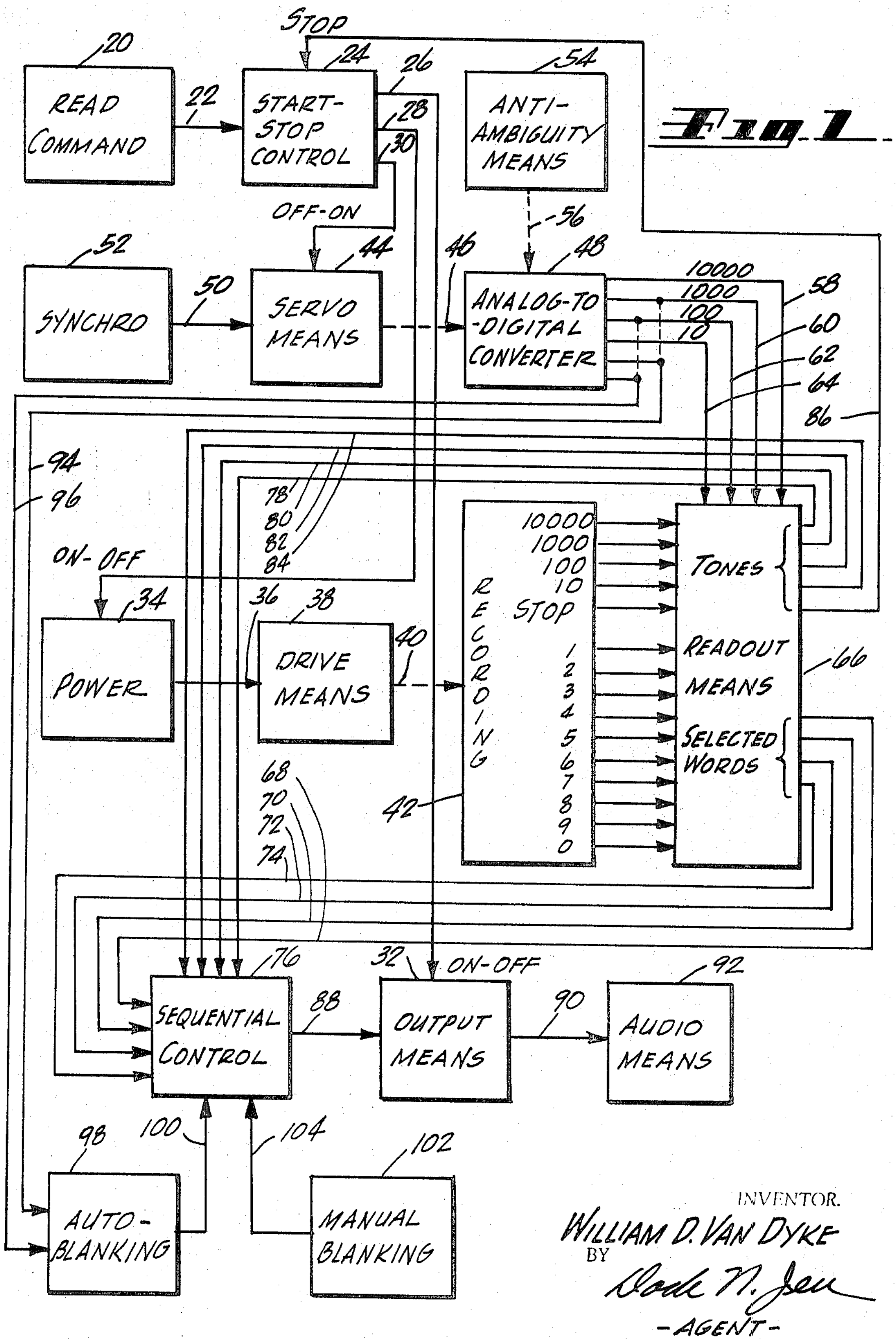
FIG. 1 is a block diagram of an illustrative embodiment of this invention.

FIG. 1 is a block diagram of an illustrative embodiment of my invention. When a reading of, for example altitude of an aircraft mounting the invention is desired, the operator operates read command means 20 which then provides a start signal on line 22 to start-stop control means 24. The control means 24 responsively produces control signals on respective lines 26, 28 and 30. The signal on line 26 is applied to output means 32 to turn on the same. The signal on line 28 is applied to power means 34 to turn on the same; that is, apply power on line 36 to energize drive means 38 which mechanically drives through line 40, recording means 42 which is, for example, an endless magnetic tape having a plurality of recording channels thereon.

The signal on line 30 is applied to servo means 44 to turn off or stop the same from mechanically driving through line 46, analog-to-digital converter means 48. The servo means 44 is responsively controlled by the output signal on line 50 from synchro means 52 which provides an analog signal that is representative of aircraft altitude. Thus, the servo means 44 drives the converter means 48 in accordance with the altitude signal from the synchro means 52 and when the servo means 44 is turned off or stopped, the converter means 48 is also stopped to provide a digital output corresponding to the aircraft altitude at the instant that the read command means 20 was operated. Anti-ambiguity means 54 controls the converter means 48 mechanically through line 56 to prevent an ambiguous digital output from the converter means 48.

Digital outputs from the converter means 48 of four numerical decades are represented by respective lines 58, 60, 62 and 64 and control readout means 66 so that corresponding recording channels of the driven tape of recording means 42 are read to provide selected word signals on lines 68, 70, 72 and 74 to sequential control means 76. Other recording channels of the driven tape are also read by readout means 66 to provide tone signals of predetermined durations and sequential occurrences on lines 78, 80, 82, 84 and 86. The tone signals on lines 78, 80, 82 and 84 are applied to sequential control means 76 and govern the duration and sequence of the appearance on line 88 of the selected word signals from the lines 68, 70, 72 and 74. Since the line 88 is applied to output means 32 which has been turned on (circuit closed) by the signal on line 26, the selected word signals are applied by line 90 to audio means 92 which is, for example, a loudspeaker. After the last tone signal (for the "tens" numerical decade) has been read by readout means 66, a stop signal is next read from the driven tape and applied through line 86 to control means 24 to complete the cycle by turning off output means 32 and power means 34 through lines 26 and 28, respectively, and turning on through line 30 the servo means 44 which quickly positions the converter means 48 in accordance with the instant analog output of the altitude synchro means 52.

The converter means 48 also produces blanking signals on lines 94 and 96 whenever the respective digital outputs of lines 60 and 62 are zero. This relationship between lines 94 and 96 to lines 60 and 62, respectively, is indicated by the broken lines connecting such corresponding pairs of lines. The lines 94 and 96 are connected to auto-blanking means 98 which controls the passage of the selected word signals through the sequential control means 76. This control is indicated by line 100 and is effected by shorting out the word signals of "zero thousand" and "zero hundred" corresponding to such respective digital outputs of the lines 60 and 62, from passing through the sequential control means 76. The manual blanking means 102 permits manual selection of blanking (shorting out) any of the selected word signals on the lines 68, 70, 72 and/or 74. Such selection control is indicated by line 104.

Figure 2:
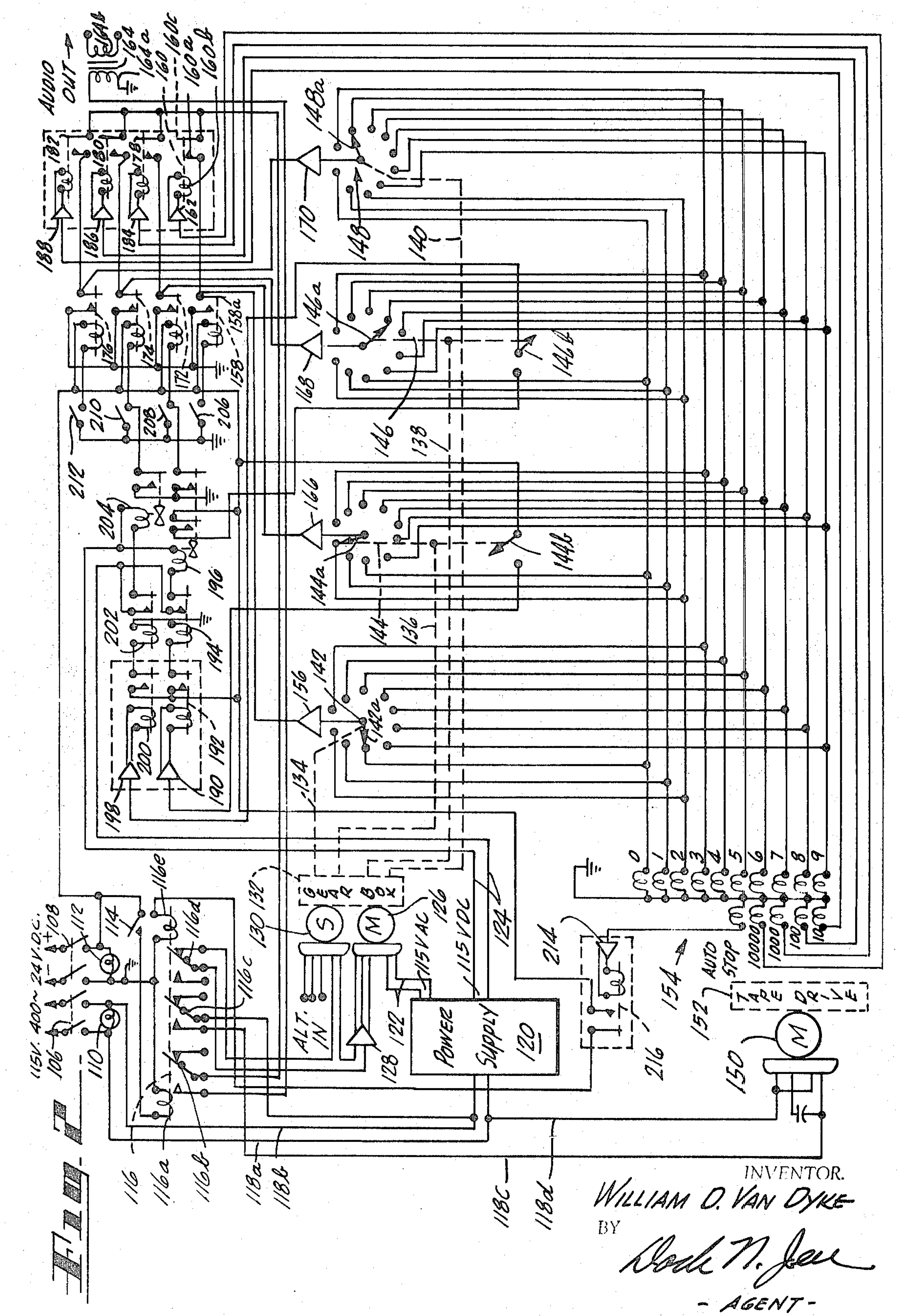
FIG. 2 is a circuit diagram of one version of the invention.

FIG. 2 is a circuit diagram of one illustrative version of this invention. Power is applied to the system shown by closing switches 106 and 108 which respectively connect alternating and direct voltages thereto. When the switches 106 and 108 are closed, indicator lamps 110 and 112 are energized to indicate that alternating and direct voltages, respectively, are being provided to the system. A switch 114, which can be a momentary pushbutton switch located on an end of the control wheel of an aircraft mounting the system, is pushed (closed and released) to obtain an announcement reading of, for example, the altitude of the aircraft at that instant. When the switch 114 is closed, relay coil **116*a* of a triple pole, double throw magnetically latching relay 116 is energized. The energized coil 116*a* causes the relay poles 116*b*, 116*c* and 116*d* to be deflected from their positions shown in FIG. 2 to engage their respective left contacts. The poles 116*b*, 116*c* and 116*d* will remain in this position when the switch 114 is released and opened because of small latching or holding magnets suitably attached to each of the relay poles 116*b*, 116*c* and 116*d* will be deflected back and held to their respective right contacts. The switch 114 corresponds to the read command means 20, and relay 116 corresponds to start-stop control means 24** in FIG. 1.

When the switch 106 in FIG. 2 is closed, alternating line power is provided on leads **118*a* and 118*b* to power supply 120 which produces 115 volts regulated alternating and direct voltages on respective sets of leads 122 and 124. The leads 122 are connected to one phase winding of servomotor 126 and the other, center-tapped, phase winding thereof is connected to the output of a servo amplifier 128. The input to the servo amplifier 128 is obtained from the output winding of synchro receiver 130 through relay pole 116*d* engaging its right contact. Input to the synchro receiver 130 is, of course, provided by a synchro transmitter (not shown) which corresponds to the transmitter portion of the synchro means 52 of FIG. 1. Thus, when relay pole 116*d* is engaging its right contact, the servomotor 126 is driven in accordance with the output signal from the synchro receiver 130** which follows the synchro transmitter analog output that is controlled by, for example, an altimeter.

Gearing 132 is driven by servomotor 126 to position the rotor of the synchro receiver 130 and drive output shafts 134, 136, 138 and 140 which rotate respective poles **142*a*, 144*a*, 146*a* and 148*a* of the ten position switches 142, 144, 146 and 148. The shafts 134, 136, 138 and 140 provide respective 10000-decade, 1000-decade, 100-decade and 10-decade analog outputs from appropriate connections of the gearing 132. However, an output from any of the poles 142*a*, 144*a*, 146*a* and 148*a* can be obtained only when the pole engages one of its ten position contacts. It is, therefore, apparent that the switches 142, 144, 146 and 148 convert the analog output of each of the shafts 134, 136, 138 and 140 respectively into a digital output. The conditions of the switches 142, 144, 146 and 148, or positions of their wipers 142*a*, 144*a*, 146*a* and 148*a*, provide a digital number output or symbolic representation which is variable in accordance with altimeter reading or altitude, for example. The switches 144 and 146, in this example, each includes two wafers having respective wafer poles which are ganged together. The switch 144 has pole 144*b* in addition to the pole 144*a*, and switch 146 has pole 146*b* in addition to the pole 146*a*. The servomotor 126, servo amplifier 128, synchro receiver 130 and gearing 132 correspond to the servo means 44 in FIG. 1, the shafts 134, 136, 138 and 140 correspond to the output line 46 thereof, and switches 142, 144, 146 and 148 correspond to the analog-to-digital converter means 48**.

When the relay pole **116*c* engages its left contact, alternating line power is applied through the leads 118*c* and 118*d* to drive motor 150 which actuates tape drive 152 that drives an endless magnetic tape (not shown) having at least fifteen recording channels thereon. These fifteen channels are associated with fifteen respective readout heads 154 labeled 0, 1, 2, 3, 4, 5, 6, 7, 8, 9, 10, 100, 1000, 10000 and auto-stop, as shown in FIG. 2. The line power on leads 118***a* and 118*b* would correspond to the power means 34 in FIG. 1, the motor 150 and tape drive 152 correspond to the drive means 38 thereof, the magnetic tape corresponds to recording means 42 thereof, and the readout heads 154 correspond to the readout means 66.

Tone or cue signals of predetermined durations are recorded on the magnetic tape channels respectively associated with the readout heads 154 labeled 10000, 1000, 100, 10 and auto-stop. These tone or cue signals are recorded and are read out successively in the order just named. In the other remaining ten tape channels labeled 0 through 9, there are four groups of words or message elements recorded thereon and extending over the time intervals corresponding respectively to the 10000, 1000, 100 and 10 tones. The readout heads 154 labeled 0 through 9 are each connected to similar position contacts of the switches 142, 144, 146 and 148 as shown in FIG. 2.

The switch pole 142*a* is connected through amplifier 156 to relay pole 158*a* of blanking control relay 158 and to relay contact 160*a* of sequential control relay 160. The relay coil 160*b* is connected to the output of amplifier 162 which has its input connected to the readout head 154 for the 10000 tone. The relay pole 160*c* is connected to the input winding 164*a* of output transformer 164 when the relay pole 116*b* is deflected to engage its left contact, and the output winding 164*b* is connected to, for example, a loudspeaker (not shown). Thus, when the readout head 154 for the 10000 tone produces an output signal, the amplifier 162 energizes relay coil 160*b* to cause the pole 160*c* to engage its contact 160*a*. If the relay pole 116*b* is engaging its left contact and the blanking control relay 158 is not energized, the signal being read out by one of the readout heads 154 labeled 0 through 9, as determined by the position of the switch pole 142*a*, is amplified by the amplifier 156 and reproduced by the loudspeaker.

Similarly, the switch poles 144*a*, 146*a* and 148*a* are connected through respective amplifiers 166, 168 and 170 to relay poles of blanking control relays 172, 174 and 176, and to relay contacts of sequential control relays 178, 180 and 182. The relay coils of the sequential control relays 178, 180 and 182 are connected to the respective outputs of amplifiers 184, 186 and 188 which have their inputs connected to the readout heads 154 for the 1000, 100 and 10 tones, respectively. The relay poles of the relays 178, 180 and 182 are connected to the relay pole 116*b* together with the relay pole 160*c*, and are connected to the input winding 164*a* of the output transformer 164 when the relay pole 116*b* engages its left contact. Thus, when the readout heads 154 for the 1000, 100 and 10 tones produce their successive output signals, the amplifiers 184, 186 and 188 successively energize their respective relay coils of the sequential control relays 178, 180 and 182. Accordingly, if the relay pole 116*b* is engaging its left contact and the blanking control relays 172, 174 and 176 are not energized, the position of the switch poles 144*a*, 146*a* and 148*a* will establish the particular ones of the readout heads 154 labeled 0 through 9 which would have their output signals respectively amplified by the amplifiers 166, 168 and 170 and successively reproduced by the loudspeaker (not shown).

The illustrative example of this invention as shown in FIG. 2 was designed to provide voice readouts primarily during the take-off and landing phases of an aircraft. Altitudes below approximately 10,000 feet are involved and the auto-blanking means provided in this illustrative example was designed to operate under such conditions. The switch pole 144*b* of the switch 144 is connected to +24 volts when the switch 108 is closed, and only its contact corresponding to the contact connected to the readout head labeled 0 of the pole 144*a* is utilized and connected to the input of amplifier 190 which has its output connected to operate the control coil of relay 192. When the relay 192 is energized, +24 volts are applied to the control coil of another relay 194 which, in turn, causes energization of a higher voltage relay 196. The relay 196 is a double pole relay in which its left pole is connected to +24 volts and the contact for the left pole is connected to the contact for the switch pole 146*b* of the switch 146.

The right pole of the relay 196 is connected through the control coil of blanking control relay 172 to +24 volts. The contact for the right pole of the relay 196 is connected to ground as shown in FIG. 2. When the right pole of the relay 196 is grounded through its contact, the blanking control relay 172 is energized to cause its relay pole to engage its contact which is connected to ground. Since the relay pole of the relay 172 is connected to the output of the amplifier 166, the output of such amplifier 166 is shorted out to ground. Thus, when the 1000-decade switch 144 is at its zero contact position, the recorded output readout by the pickup head 154 labeled 0 will be blanked out at the output of the amplifier 166 due to energization of the blanking control relay 172.

The switch pole 144*b* must engage its contact before the relay 196 is energized to provide +24 volts to the contact for the switch pole 146*b* of the 100-decade switch 146. The switch pole 146*b* engages its contact when the 100-decade switch 146 is at its zero contact position. Power will then be applied to the input of amplifier 198 which has its output connected to operate the control coil of relay 200. When the relay 200 is energized, +24 volts are applied to the control coil of another relay 202 which, in turn, causes energization of a higher voltage relay 204. The relay 204 has its relay pole connected through the control coil of blanking control relay 174 to +24 volts. The contact for the pole of the relay 204 is connected to ground as shown in FIG. 2.

When the pole of the relay 204 is grounded through its contact, the blanking control relay 174 is energized to cause its relay pole to engage its contact which is connected to ground. Since the relay pole of the relay 174 is connected to the output of amplifier 168, the output of such amplifier 168 is shorted out to ground. Thus, when the 1000-decade switch 144 and the 100-decade switch 146 are at their zero contact positions, the blanking control relay 174 will be energized and the recorded output readout by the pickup head 154 labeled 0 will be blanked out at the output of the amplifier 168. The recorded words "zero thousand" and "zero hundred" will be successively blanked out automatically when the 1000-decade and 100-decade switches 144 and 146 are at their zero contact positions. It can be seen that the switch poles 144*b* and 146*b* of the switches 144 and 146, and their associated amplifiers 190 and 198 through to the blanking control relays 172 and 174, respectively, correspond to the auto-blanking means 98 of FIG. 1.

The manual blanking means 102 of FIG. 1 corresponds to manual blanking control switches 206, 208, 210 and 212 shown in FIG. 2. The poles of the switches 206, 208, 210 and 212 are all connected to ground, and the pole contacts are connected respectively through the control coils of blanking control relays 158, 172, 174 and 176 to +24 volts. These switches 206, 208, 210 and 212 can be selectively operated to blank the readout from any undesired or uncritical decade switch 142, 144, 146 and/or 148. For example, where information above 10,000 feet is undesired, the manual blanking control switch 206 is closed to energize the blanking control relay 158 to short or blank out any output from the amplifier 156. Under cruise flight conditions, the switches 212 and 210 might be closed to energize their respective blanking control relays 176 and 174 which would short or blank out the outputs of the amplifiers 170 and 168 to give readouts only to the nearest thousand feet.

The readout heads 154 labeled 10000, 1000, 100 and 10 produce successive tone or cue signals which are applied to operate respective sequential control relays 160, 178, 180 and 182 as described above. The last tone or cue signal is successively produced from the readout head 154 labeled auto-stop. This last signal is applied to the input of amplifier 214 which has its output connected to operate relay 216. When the relay 216 is energized, +24 volts are applied to the control coil 116*e* of the magnetically latching relay 116. This will return the relay poles 116*b*, 116*c* and 116*d* back to engage their respective right contacts. The relay pole 116*b* breaks the circuit to the output transformer 164, the relay pole 116*c* breaks the circuit supplying line power to tape drive motor 150 and the switch pole 116*d* closes the circuit from the output winding of synchro receiver 130 to servo amplifier 128 to cause the servo motor 126 to drive the poles of the decade switches 142, 144, 146 and 148 quickly to positions corresponding to the instantaneous altitude input signal being supplied to the synchro receiver 130. The decade switches 142, 144, 146 and 148 will, of course, be driven in accordance with the changes in altitude input to the synchro receiver 130 until the switch 114 is again closed to repeat the operation cycle to obtain another readout of aircraft altitude. The auto-stop amplifier 214 and relay 216 are the implementation of means which generally corresponds to the control line 86 shown in FIG. 1.

Figure 3:
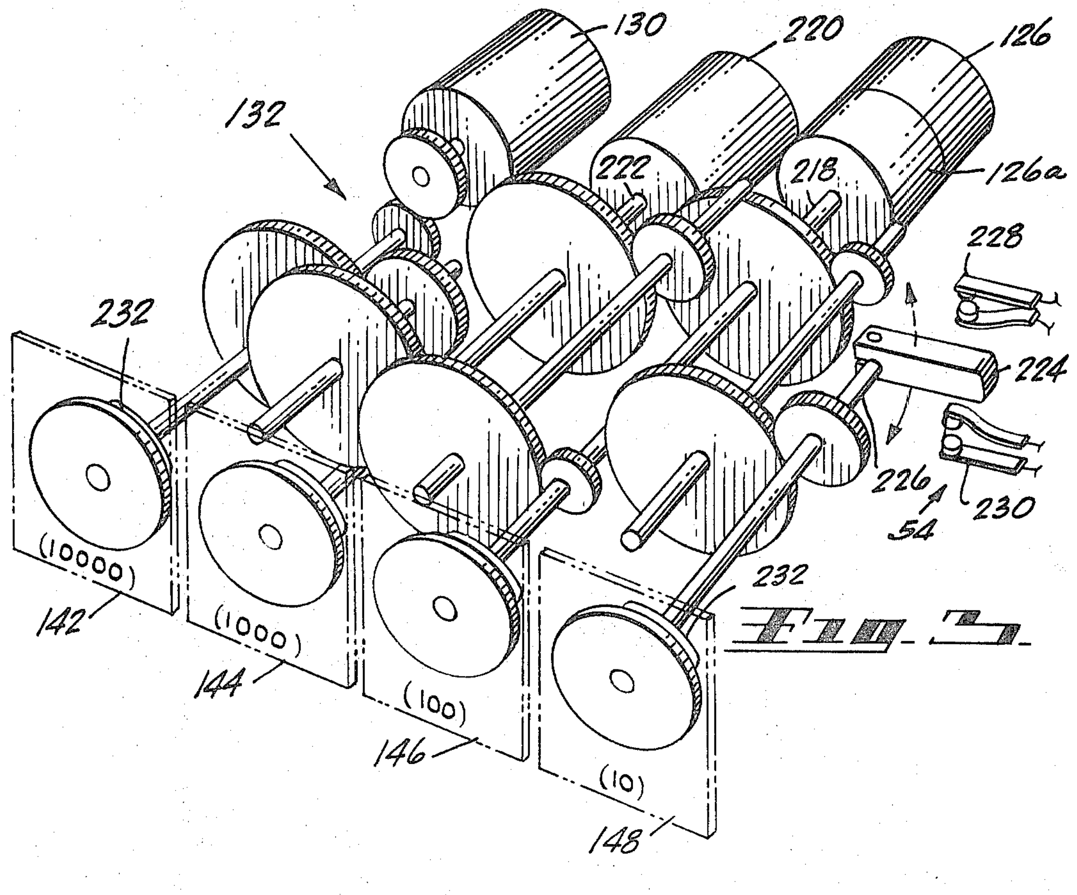
FIG. 3 is a partially simplified perspective view of the actual drive means and decade switch components which were shown schematically in FIG. 2.

FIG. 3 is a perspective view, shown in somewhat simplified and schematic form, of the servomotor 126, synchro receiver 130, gearing 132, and decade switches 142, 144, 146 and 148 indicated in FIG. 2. There is also shown generally the anti-ambiguity means 54 indicated in FIG. 1. The servomotor 126 drives the precision gear train or gearing 132 in either direction through a 1029:1 gearhead 126*a* which has its output suitably coupled to shaft 218. In this illustrative example of the invention, the servomotor 126 drives gearing 132 at a maximum speed corresponding to 600 counts per minute of the lowest decade switch 148. Anti-backlash gearing suitably clamped to shafts running in precision ball bearings are used throughout the mechanism shown in FIG. 3. Suitable gears are used in the gearing 132 to provide a step-up gear train from the ouput of the synchro receiver 130 to the last decade switch 148.

The synchro receiver 130, of course, matches the synchro transmitter in the aircraft's altimeter (not shown) and one revolution of the output of the synchro receiver 130 is equivalent to 70,000 feet of altitude. Another synchro receiver 220 is connected directly to shaft 222 of the 1000-decade switch 144 providing a rotation equivalent to 10,000 feet per revolution. This synchro receiver 220 is provided to permit operation from radio or radar altimeters rather than from the usual barometric altimeter. A lever arm 224 is also mounted to the last shaft 226 and is rotated upwards or downwards to close switch 228 or 230, respectively. The lever arm 224 is suitably mounted on the shaft 226 to slip thereon after either of the switches 228 or 230 are held closed by the deflected lever arm 224. The decade switches 142, 144, 146 and 148 are each coupled to their respective shafts of the gearing 132 by a snap-action anti-ambiguity device 232. The lever arm 224, the switches 228 and 230, and the snap-action devices 232 are part of the anti-ambiguity means 54 indicated in FIG. 1.

Figure 4:
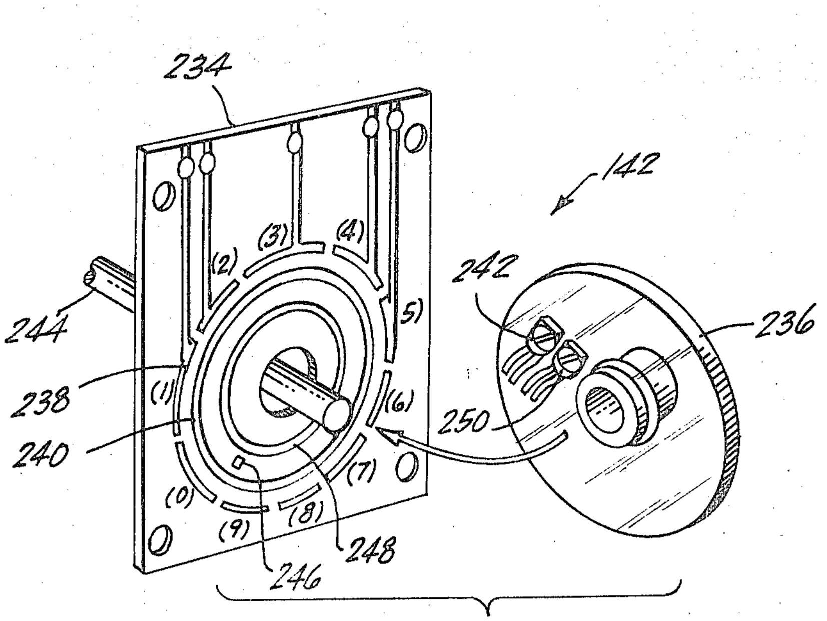
FIG. 4 is a partially exploded, perspective view of an illustrative embodiment of one of the decade switches shown broadly in FIG. 3.

FIG. 4 is a partially exploded, perspective view of an illustrative embodiment of the 1000-decade switch 142. This switch 142 includes a suitably mounted, stationary, printed circuit board 234 and a cooperative rotor disc 236. The non-conductive board 234 has a conductive ring 238 which is segmented into ten equal sections, and a radially inner, concentric continuous conductive ring

240. The rings 238 and 240 are engaged by respective brushes of a shorting or bridging wiper 242 when the disc 236 is properly mounted on its driving shaft 244. The segmented ring 238 corresponds to the ten contacts engaged by the pole 142*a* as shown in FIG. 2, and the wiper 242 corresponds to the switch pole 142*a*. A short, conductive ring segment 246 is located radially inner to the ring 240 and lies arcuately within the sector bounded by the adjacent ends of the 9 and 0 segments of the 238. Another continuous conductive ring 248 is concentrically located radially inner to the segment 246, and the ring 248 and segment 246 are to be engaged by respective brushes of the shorting or bridging wiper 250 on the non-conductive disc 236. The segment 246, ring 248 and the wiper 250 are also part of the anti-ambiguity means 54 indicated in FIG. 1.

The other decade switches 144, 146, and 148 are similar in structure to that shown for the switch 142. Of course, the switches 144 and 146 would include additional segment, ring and wiper elements (not shown) corresponding to the switch poles 144*b* and 146*b* and their respective contacts shown in FIG. 2 to perform the auto-blanking function thereof. The conductive segments and rings on the printed circuit board 234 have the usual printed circuit board lead connections on both faces and are suitably connected to their corresponding circuits.

Figure 5:
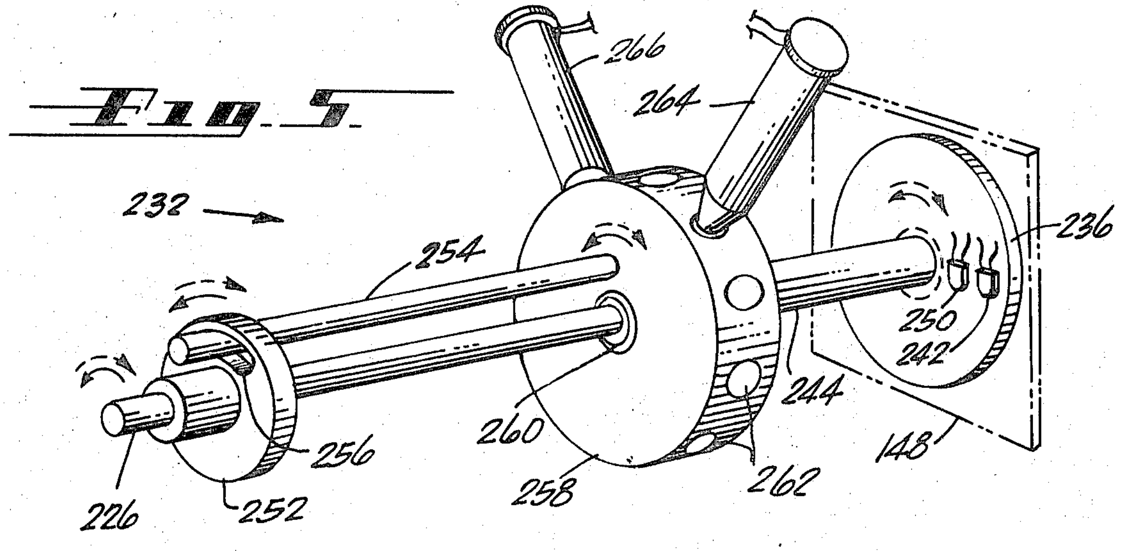
FIG. 5 is a perspective view of an anti-ambiguity device indicated broadly in FIG. 3.

FIG. 5 is a perspective view of the snap-action, anti-ambiguity device 232 broadly indicated in FIG. 3 for the 10-decade switch 148 which has similar components as the switch 142 shown in FIG. 4. A drive disc 252 is suitably secured to shaft 226 which is driven by gearing 132 (FIG. 3). A secondary shaft 254 has one end engaging a small arcuate slot 256 (approximately 10 degrees long, for example) and the other end affixed to a driven disc 258. The driven disc 258 mounts a central bearing 260 which journals the end of shaft 226. The disc 258 also carries ten small (Armco iron) pins 262 radially inserted at equal spacings around the circumference thereof. The shaft 244 of the rotor disc 236 carrying the wipers 242 and 250 is affixed to the driven disc 258 such that the disc 236 is driven along with the disc 258. Two small electromagnets 264 and 266 are rigidly mounted in positions such that their maximum field intensity is adjacent to the perimeter of the driven disc 258. The function of the anti-ambiguity device 232 is to provide a magnetic snap action in advancing (in either ascending or decending order) the switch pole of the decade switch quickly across the deadband between digit contacts when the pole of the next lower decade switch is moved from its nine digit contact to its zero digit contact or from zero to nine (ascending or descending order). This is particularly important for the higher decades which move much slower than the lower ones.

Figure 6:
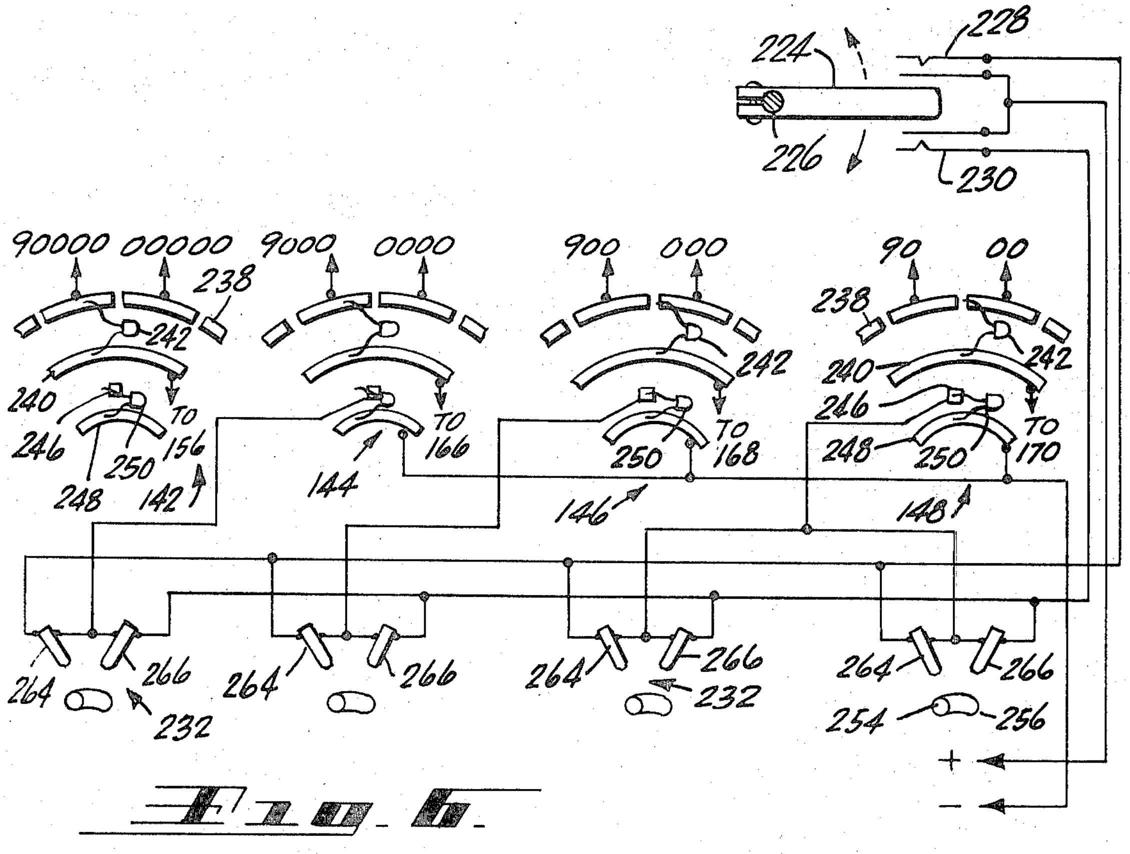
FIG. 6 is a circuit diagram of the anti-ambiguity system for the invention version shown in FIG. 2 and employing anti-ambiguity devices as illustrated in FIG. 5.

FIG. 6 is a circuit diagram of the snap-action, anti-ambiguity system involving lever arm 224, switches 228 and 230, the four anti-ambiguity devices 232, and the decade switches 142, 144, 146 and 148. From FIG. 5, where the shaft 226 is rotated in the direction of the solid line arrow, the drive disc 252 is rotated a small amount before the right end of slot 256 engages the secondary shaft 254 to drive the driven disc 258 and the rotor disc 236. During this movement, the lever arm 224 shown in FIG. 6 is rotated downwards to close the switch 230 and slips on the shaft 226. It can then be seen that power is applied to one side of the right electromagnets 266. When the brushes of the bridging wiper 250 of the switch 148 engage the conductive segment 246, the circuit from the other side of both electromagnets 266 for the decade switches 146 and 148 is closed through such wiper 250 and the conductive ring 248 of the switch 148. This energizes the electromagnet 266 for the switch 148 and rotates the disc 258 (FIG. 5) so that a pin 262 is aligned with such electromagnet 266.

When this is taking place, the wiper 242 (FIG. 6) for the switch 148 is rapidly moved across the gap from the ninety segment to the zero segment of ring 238. The wiper 250 is, of course, rapidly moved across the segment 246. The electromagnet 266 for the switch 146 is also energized so that a similar snap action occurs for its wipers 242 and 250. For the exemplary decade switch 146 condition shown in FIG. 6, the electromagnet 266 for the next decade switch 144 is also energized for the same purpose. The conditions for the switches 146 and 148 were selected to illustrate the snap action produced in successive decade switches. Since the decade switch 142 is the last one, its conductive segment 246 cannot be connected to a higher decade switch. A similar action occurs for decade switch rotation in a decending order except that the lever arm 244 is deflected upwards and the appropriate left electromagnets 264 will be energized in accordance with any required digit changes between any of the decade switches 142, 144, 146 and 148.

Figure 7:
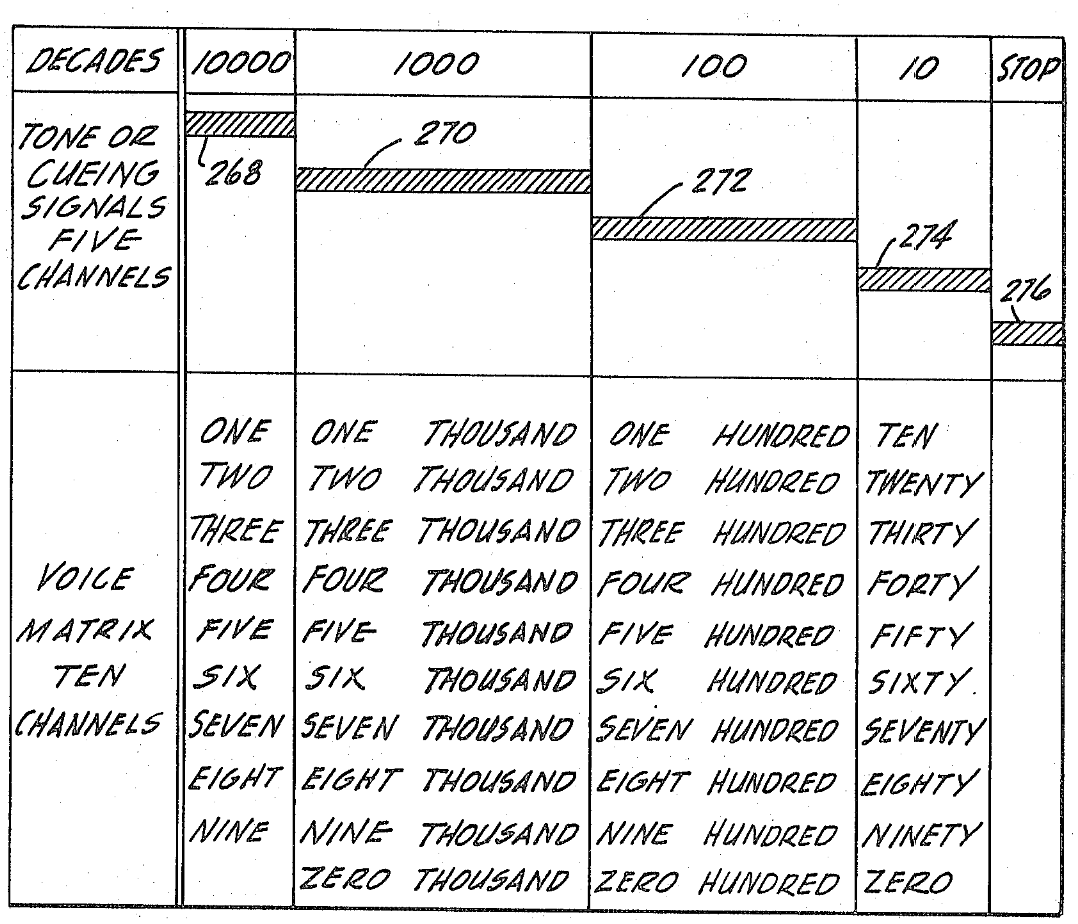
FIG. 7 is a diagrammatic chart depicting the tone or cue signals and the words or voice signals which may be utilized in this invention.

FIG. 7 is a diagrammatic chart illustrating the tone or cue signals and the message elements or voice signals which are recorded in the different channels on the endless magnetic tape that is driven by the motor 150 in FIG. 2. The fifteen tape channels are vertically indicated from top to bottom in the chart, and the distance horizontally along each channel generally represents the time durations of the five tone or cue signals for the 10000, 1000, 100, 10 and auto-stop tape channels. The relative lengths of the successive bars 268, 270, 272, 274 and 276 generally indicate the respective time durations required for recording or reading out sequentially the message elements or voice signals in any of the ten spoken digit channels and for stopping a readout operation at the end of a cycle.

The recording of the spoken digits on the endless tape in a matrix format as shown in FIG. 7 effectively eliminates search time in providing a spoken readout of any instantaneous altitude. Each altitude readout is normally composed of four successive message elements, or less. The altitude of 17,690 feet is, for example, read out as "one seven thousand six hundred ninety" and any other altitude will be similarly read out. The ten channels on the tape are thus used to provide an equivalent vocabulary of ten thousand words which are required for a four-decade readout system. It is noted that the spoken word "zero" is unnecessary in the last tape channel (lowest one in FIG. 7) for the highest 10000-decade digit and has been therefore omitted.

Figure 8:
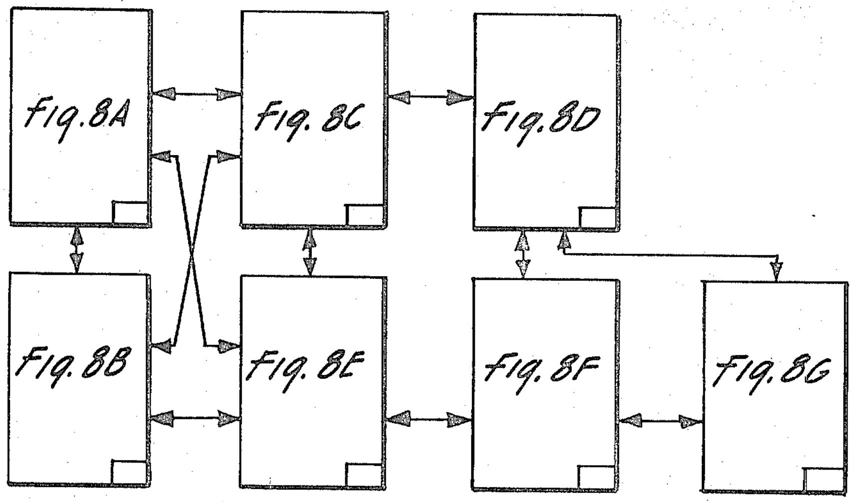
FIG. 8 is a diagram showing a suggested arrangement of the FIGS. 8A, 8B, 8C, 8D, 8E, 8F and 8G to facilitate the overall viewing thereof.

FIG. 8 is a diagram showing a suggested arrangement for positioning the FIGS. 8A, 8B, 8C, 8D, 8E, 8F and 8G to facilitate the viewing thereof. In the arrangement of figures shown in FIG. 8, the lead ends therein are labeled by lower case letters and can be matched between generally adjacent figures. For example, the labeled lead ends on the right side of FIG. 8A can be matched similarly labeled lead ends on the left sides of FIGS. 8C and 8E. The labeled lead ends on the lower side of the FIG. 8A can be likewise matched by similarly labeled lead ends on the upper side of the adjacent FIG. 8B. This arrangement of the FIGS. 8A through 8G may be further desirable to enable an overall view of all of these figures and the interconnections therebetween.

Figure 8A:
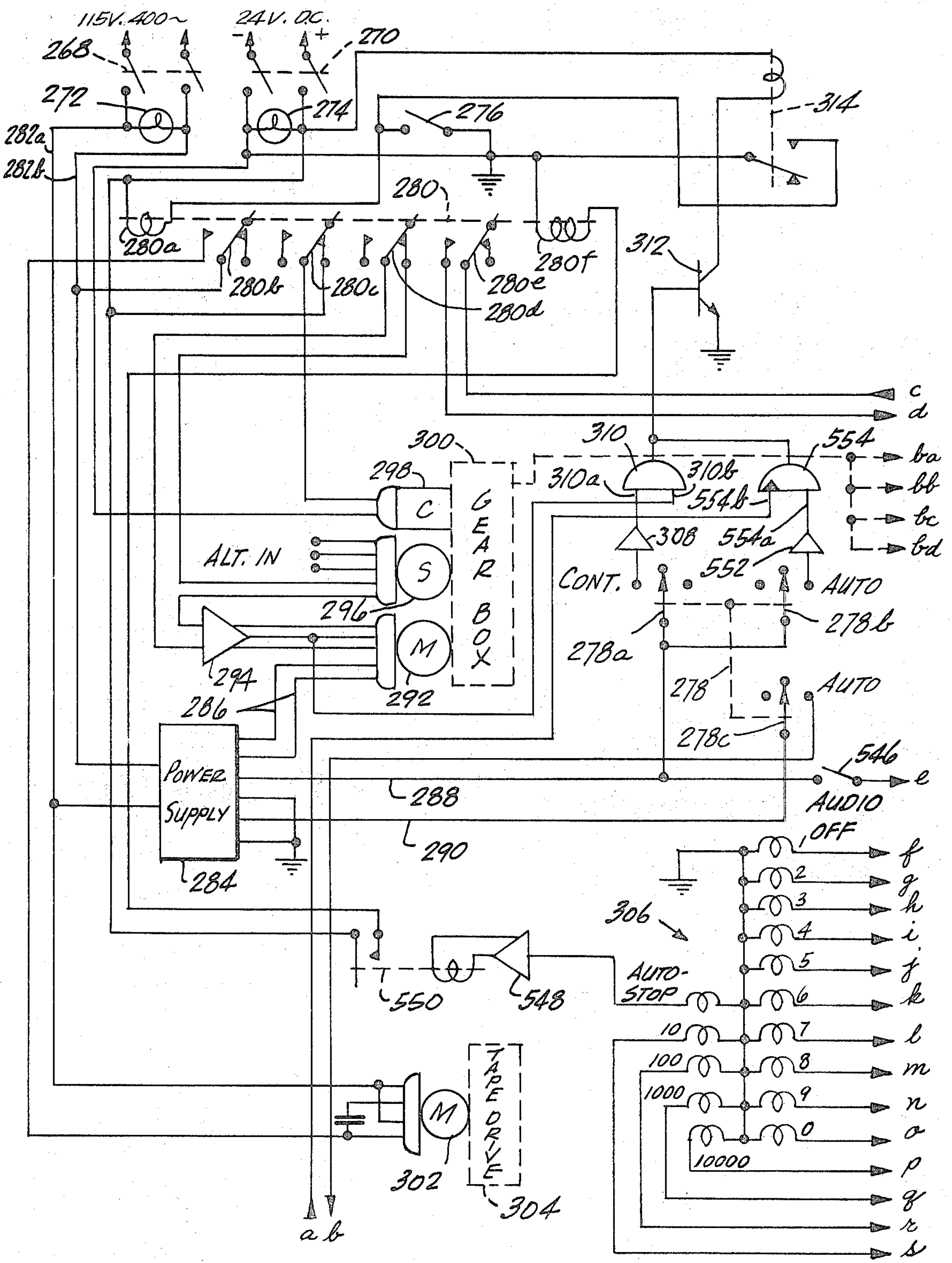
FIGS. 8A through 8G, together, comprise a circuit diagram of another version of this invention.

FIGS. 8A, 8B, 8C, 8D, 8E, 8F and 8G, together, comprise a circuit diagram of another illustrative example of my invention. Joint reference to these figures will be made in the following description thereof. The circuit of FIG. 2 is generally similar in some extent to that shown in FIGS. 8A through 8G and, for comparative purposes, an attempt will be made to parallel the description of the latter figures where possible with the description for the former (FIG. 2). In FIG. 8A, alternating and direct voltages are applied to the system shown by closing the ganged switches 268 and 270. When the switches 268 and 270 are closed, indicator lamps 272 and 274 are energized to indicate that alternating and direct voltages are respectively being applied to the system. A switch 276 which can be a momentary pushbutton switch located on an end of the control wheel of an aircraft mounting the system, can be pushed (closed and released) to obtain a voice reading of, for example, the altitude of the aircraft at that instant. Alternatively, continuous sequential readings can be obtained by placing a triple pole, three position switch 278 in its continuous (left) contact position.

When the switch 276 is closed momentarily, relay coil **280*a* of a four pole, double throw magnetically latching relay 280 is energized. The energized coil 280*a* causes the relay poles 280*b*, 280*c*, 280*d* and 280*e* to be deflected from their positions shown in FIG. 8A to engage their respective left contacts. When the relay coil 280*f* is subsequently energized at the end of a readout cycle, the poles 280*b*, 280*c*, 280*d* and 280*e* will be deflected back to their respective right contacts. The relay 280 is, of course, similar in structure and function to the relay 116 shown in FIG 2. The alternating line power from the closed switch 268 is provided on leads 282*a* and 282*b* to power supply 284 which produces regulated 115 volts alternating voltage on leads 286, +3 volts direct voltage on lead 288 and +24 volts direct voltage on lead 290, for example. The leads 286 are connected to one phase winding of servomotor 292, the other, center-tapped, phase winding thereof being connected to the output of a servo amplifier 294. The input to the servo amplifier 294 is obtained from the output winding of synchro receiver 296 through relay pole 280*d* engaging its right contact. Input to the synchro receiver 296 is, of course, provided by a synchro transmitter (not shown) which corresponds to the transmitter portion of the synchro means 52 of FIG. 1. Thus, when the relay pole 280*d* is engaging its right contact, the servomotor 292 is driven in accordance with the output signal from the synchro receiver 296** which follows the synchro transmitter analog output that is controlled by, for example, an altimeter.

When the relay pole **280*c* is engaging its right contact the 24 volts direct line voltage from switch 270 is applied to clutch brake 298 to energize the same. This engages the clutch portion and simultaneously releases the brake portion so that gearing 300 can be driven by the servomotor 292 to position the rotor of the synchro receiver 296** and, also, drive the mutually related output shafts *ba, bb, bc* and *bd*. When the switch 276 is closed momentarily, the relay poles **280*b*, 280*c*, 280*d* and 280*e* are deflected to engage their respective left contacts. The relay pole 280*b* then applies 115 volts alternating line voltage to motor 302 which actuates tape drive 304 that drives, for example, an endless magnetic tape (not shown) having at least fifteen recording channels thereon. These fifteen channels are associated with fifteen respective readout heads 306 labeled 0, 1, 2, 3, 4, 5 6, 7, 8, 9, 10, 100, 1000, 10000 and auto-stop as indicated in FIG. 8A. At the same time that the motor 302 is energized the relay poles 280*c* and 280*d* are positioned to de-energize the clutch brake 298 and remove any output signal from the synchro receiver 296 to the input of the servo amplifier 294, respectively. Thus, the clutch portion is disengaged and the brake portion applied as the input, if any then exists, to the servomotor 292 is removed to prevent any movement of the gearing 300** and the output shafts *ba, bb, bc* and *bd*.

Continuous sequential readings can be obtained by placing the switch 278 in its continuous position wherein the three switch poles **278*a*, 278*b* and 278*c* engage their respective left contacts. Only the pole 278*a* is effective in this mode of operation since it connects a "high" voltage (+3 volts) on lead 288 to the input of inverter 308 which, in turn, produces a "low" voltage to one input 310*a* of an inverting "and" or "nand" gate 310. The inverting "and" or "nand" gate 310 is one which produces a "high" output when both inputs are "low," and a "low" output when any one or both inputs are "high." The other input 310*b* is connected to the common output lead from the servo amplifier 294. Thus, each time when the output voltage from the servo amplifier 294 is substantially zero as would be the case whenever the synchro receiver 296 is nulled to match the output of the synchro transmitter, a "high" output is then produced from the gate 310 and applied to the base of the transistor 312. This turns on the transistor 312 and energizes relay 314 to connect the coil 280***a* of the magnetically latching relay 280 to ground. The relay 280 is thus actuated in the same manner as when the switch 276 was momentarily closed.

Tone or cue signals of predetermined durations are recorded on the magnetic tape channels respectively associated with the readout heads 306 labeled 10000, 1000, 100, 10 and auto-stop in FIG. 8A. As in the circuit of FIG. 2, these tone or cue signals are recorded and read out successively in the order just named. In the other remaining ten tape channels labeled 0 through 9 in FIG. 8A, there are four groups of message elements or voice signals recorded thereon and extending over the time intervals corresponding respectively to the 10000, 1000, 100 and 10 tones, as before. The readout heads 306 labeled 0 through 9 provide respective voice signals on the leads *f, g, h, i, j, k, l, m, n* and *o*. Similarly, the readout heads 306 *labeled* 10000, 1000, 100 and 10 provide respective tone signals on the leads *p, q, r* and *s*.

Figure 8B:
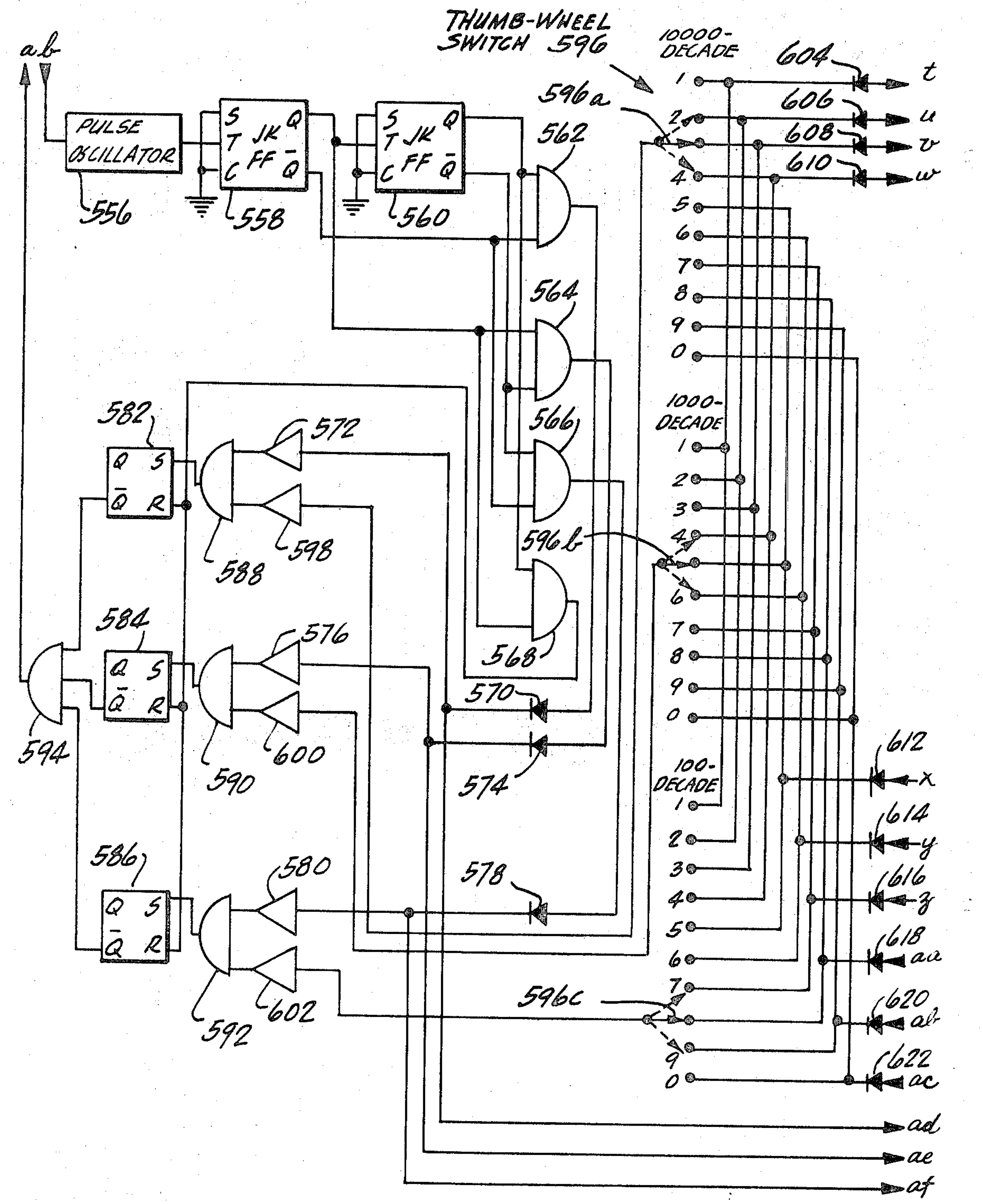

The output shaft *ba* of FIG. 8A is driven by the gearing 300 and positioned by the stopping thereof. The shaft *ba* is coupled to wiper 316*a* of a ten-position rotary switch 316 shown linearly extended in FIG. 8C, and to wipers 318*a* and 318*b* of another ten-position rotary switch 318 also shown linearly extended in FIG. 8E. Similarly, the output shafts *bb, bc* and *bd* are coupled respectively to wiper 320*a* of switch 320 (FIG. 8C) and wipers 322*a* and 322*b* of switch 322 (FIG. 8E), wiper 324*a* of switch 324 (FIG. 8D) and wipers 326*a* and 326*b* of switch 326 (FIG. 8F), and wiper 328*a* of switch 328 (FIG. 8D) and wiper 330*a* of switch 330 (FIG. 8F). The decade switches 316, 320, 324 and 328 have make-before-break contacts, and the wiper 316*a* lags (for increasing movements) the wiper 318*a* by half the interval between two successive contacts and leads the wiper 318*b* by the same half-interval distance. Thus, when the wiper 316*a* is centered on its contact "5", for example, the wiper 318*a* is located halfway between its contacts "5" and "6" while the wiper 318*b* is located halfway between its contacts "4" and "5." The wiper 318*a* will engage the beginning of its contact "6" and the wiper 318*b* will engage the beginning of its contact "5" just before the wiper 316*a* engages the start of the common make-before-break portion of its contacts "6" and "5." The wiper 316*a* leaves this make-before-break portion of the contacts "6" and "5" when the wipers 318*a* and 318*b* reach the ends of the "6" and "5" contacts, respectively. Similarly, the wipers 320*a* and 324*a* lag the wipers 322*a* and 326*a* and lead the wipers 322*b* and 326*b*, respectively, by the half-interval distance between successive contacts. The wiper 328*a* of the switch 328 is, however, aligned with the single tens-decade wiper 330*a* of the switch 330.

There are no dead or open spaces between the make-before-break contacts of the switches 316, 320, 324 and 328. However, since the switches 316, 320, 324 and 328 have such make-before-break contacts, their respective wipers 316*a*, 320*a*, 324*a* and 328*a* can engage two adjacent contacts simultaneously at the make-before-break portions thereof. In order to distinguish between which one of the two wiper-engaged contacts is to be read, the connection of even and odd contacts for the control switches 318, 322, 326 and 330 shown in FIGS. 8E and 8F is utilized. This connection of the contacts of the switches 318, 322, 326 and 330 also serves to eliminate any ambiguity in readout for the transitions of the wiper of a lower decade switch from 9 to 0 or 0 to 9; that is, for an increasing or decreasing number readout. Further, the connection of the switches 318, 322, 326 and 330 also provides suitable blanking signals for zero conditions of the 10000, 1000 and 100-decade switches 316, 320 and 324. This is generally accomplished by the provision of diodes 332, 334, 336 and 338 positioned between the "7" and "9" contacts, and diodes 340, 342, 344 and 346 positioned between the "8" and "0" contacts of the switches 318, 322, 326 and 330, respectively, and use of a series connection of +3 volts from wiper 330*a* suitably through the pairs of wipers 326*a* and 326*b*, 322*a* and 322*b*, and 318*a* and 318*b* in any appropriate zero transitions (in either direction) thereof. It may be noted here that provision for blanking all tens-decade readout when the aircraft altitude is above 1000 feet is made elsewhere in the system, for example, as will be described later.

The tone signals on leads *p, q, r* and *s* from FIG. 8A are applied to respective inverters 348, 350, 352 and 354 which are shown in FIGS. 8E and 8F. The "high" 10000-decade tone signal on lead *p* to the inverter 348 becomes a "low" signal on lead *at*. Similarly, the "high" 1000-decade, 100-decade and 10-decade tone signals on their respective leads *q, r* and *s* to the inverters 350, 352 and 354 become "low" signals on leads *au, av* and *aw*. The outputs from the inverters 348, 350, 352 and 354 are, of course, high when tone signals are not applied thereto. The leads *at* and *au* extending from FIG. 8E to FIG. 8C connect with respective inverters 356 and 358. The outputs of the inverters 356 and 358 are connected through respective diodes 360 and 362 to the 10000-decade switch wiper 316*a* and the 1000-decade switch wiper 320*a*. Similarly, the leads *av* and *aw* extending from FIG. 8F to FIG. 8D connect with respective inverters 364 and 366 which are connected through diodes 368 and 370 to the 100-decade switch wiper 324*a* and the 10-decade switch wiper 328*a*. Thus, high tone signals corresponding to those on leads *p, q, r* and *s* from FIG. 8A are provided to the decade switch wipers 316*a*, 320*a*, 324*a* and 328*a*, respectively, shown in FIGS. 8C and 8D.

Figure 8C:
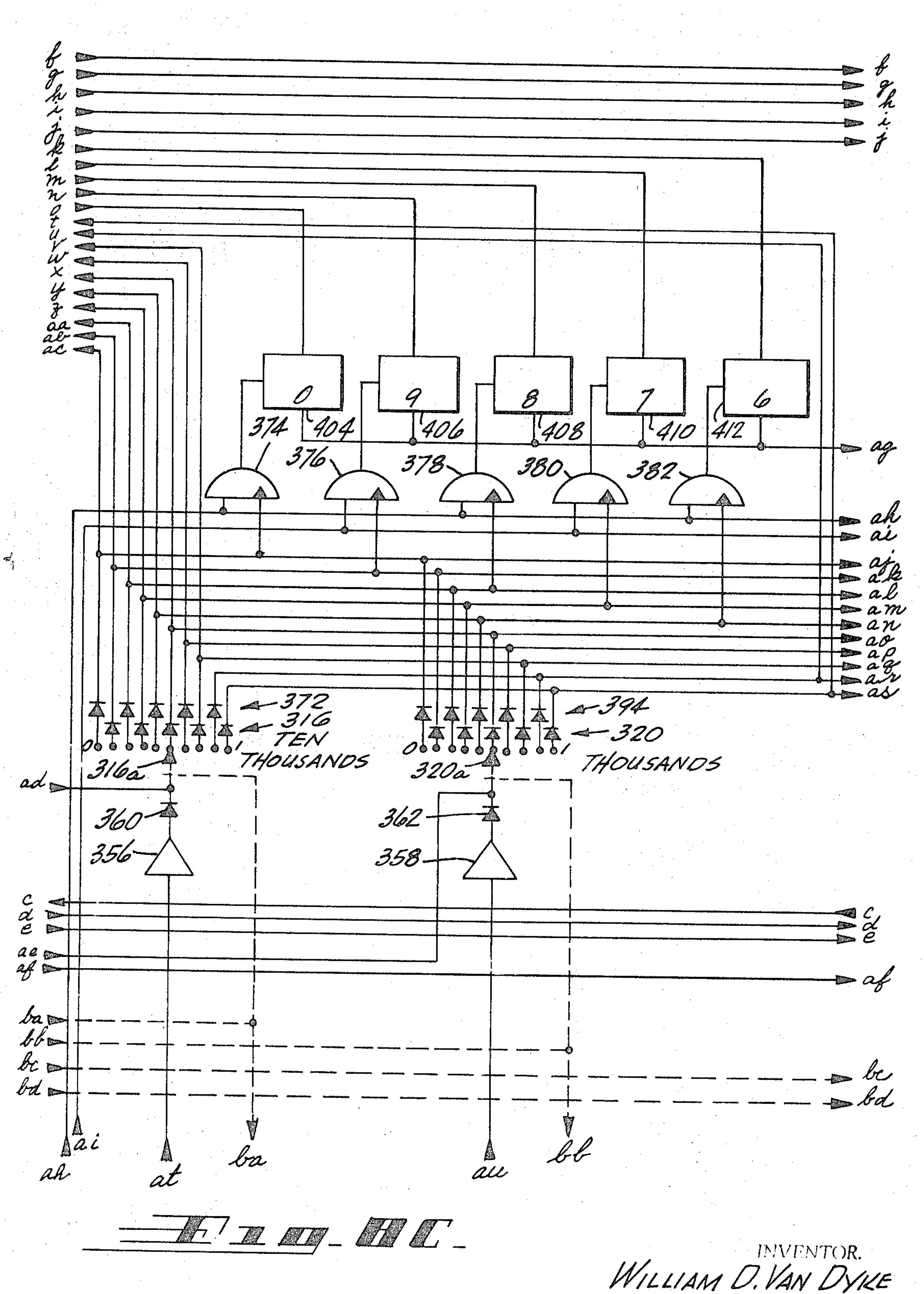
Figure 8D:
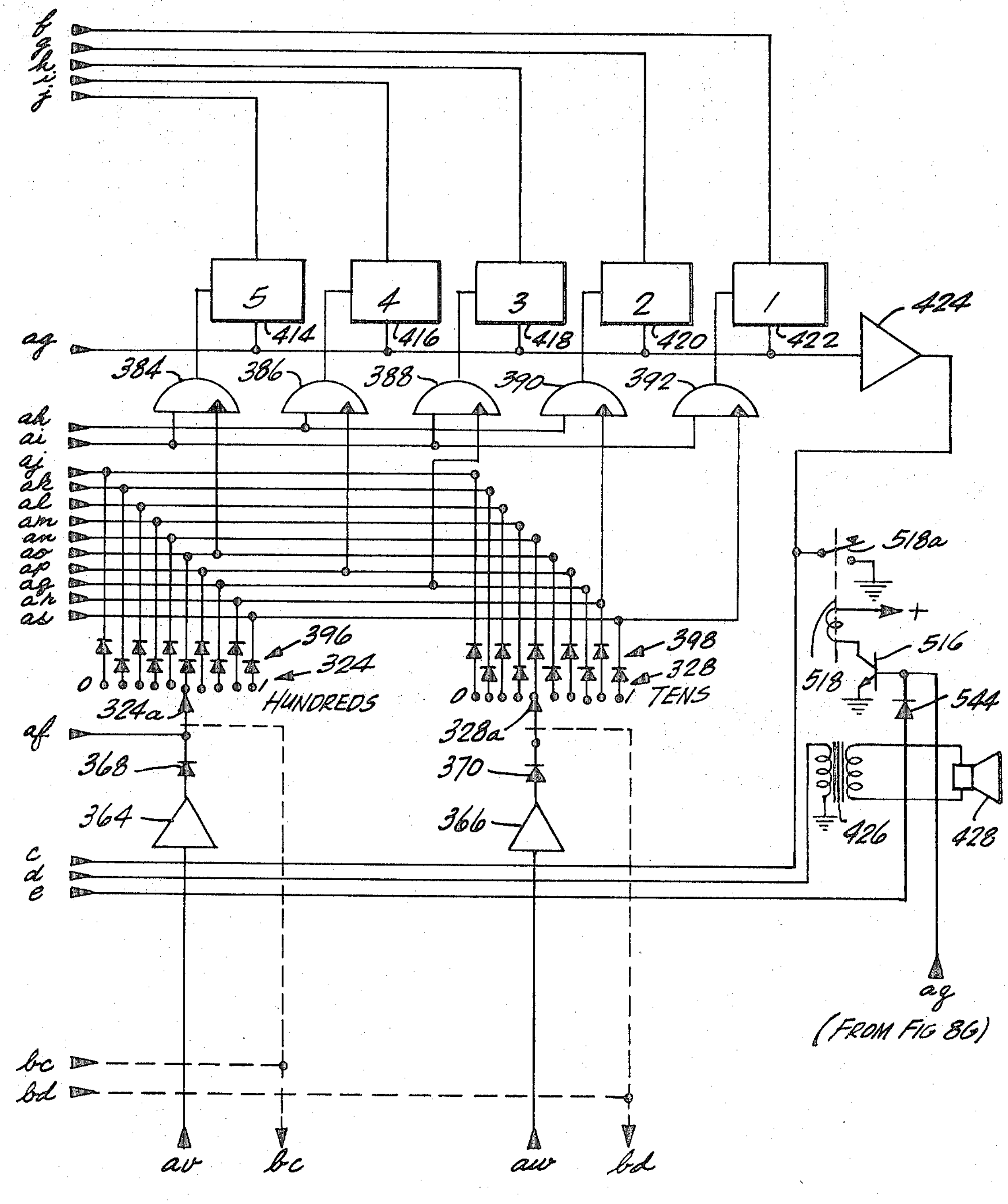
Figure 8E:
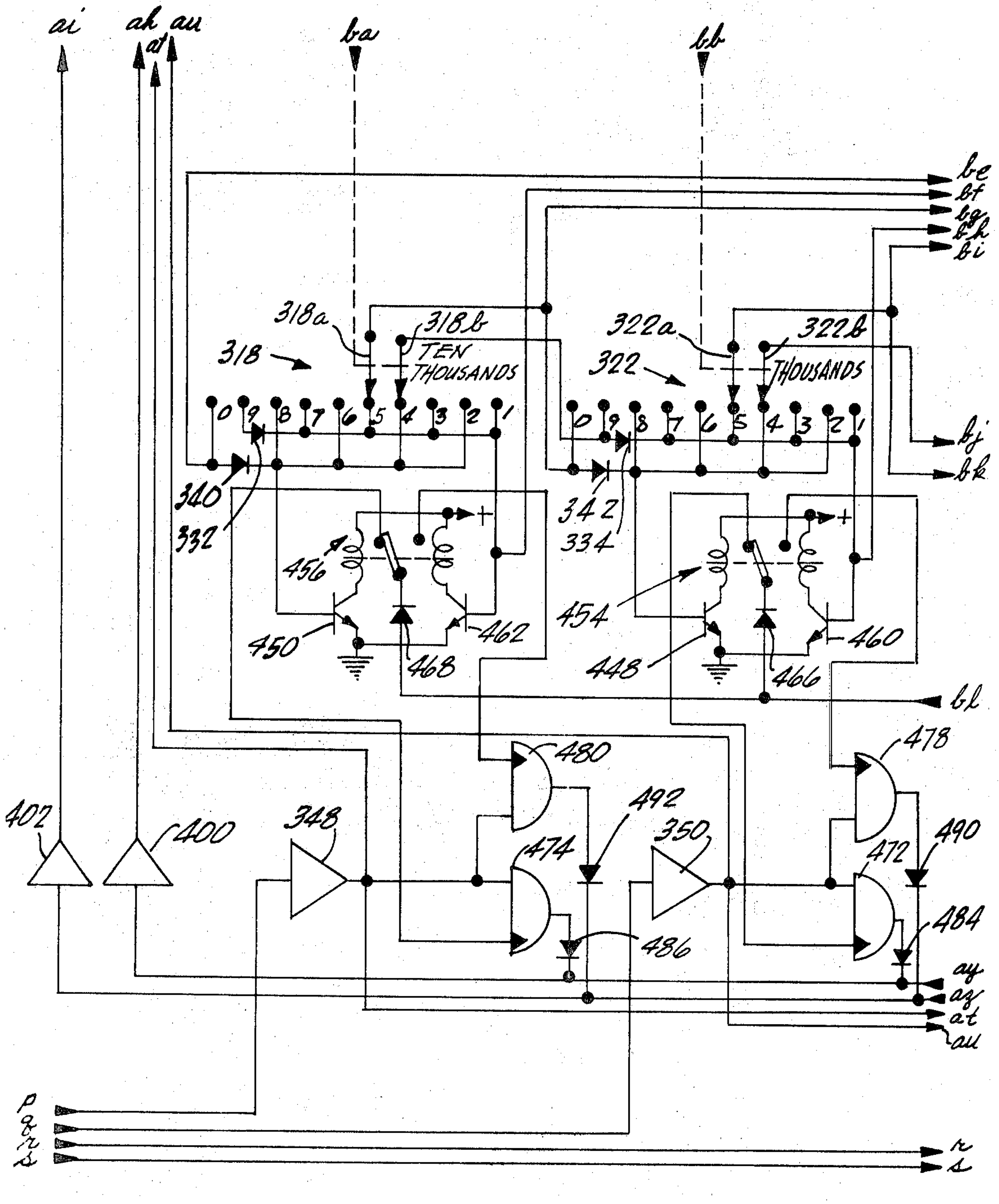
Figure 8F:
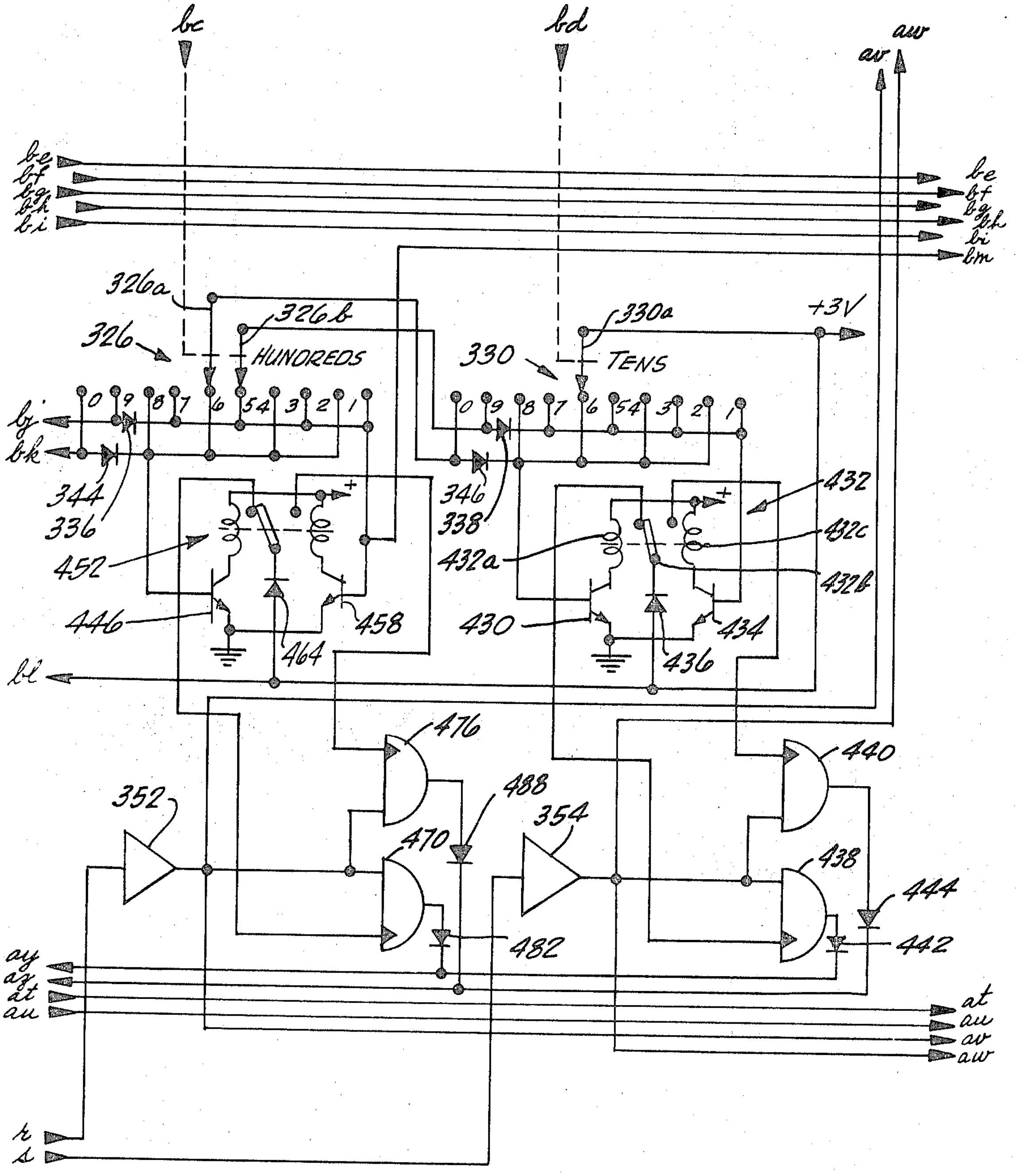

The ten contacts of the switch 316 are connected through respective diodes 372 to leads *aj, ak, al, am, an, ao, ap, aq, ar* and *as* which are, in turn, connected to one, inverting, input of ten corresponding "nand" gates 374, 376, 378, 380, 382, 384, 386, 388, 390 and 392 shown in FIGS. 8C and 8D. The ten contacts of each of the switches 320, 324 and 328 are also connected through respective sets of diodes 394, 396 and 398 to the same leads and "nand" gates just mentioned. The other input of each of the ten "nand" gates 374 through 392 is a regular, non-inverting input which is either connected to lead *ah* or lead *ai*. The leads *ah* and *ai* extend from respective inverters 400 and 402 shown in FIG. 8E, to FIGS. 8C and 8D, and control the even and odd digit sets of the gates 374 through 392. The outputs of the "nand" gates 374, 376, 378, 380, 382, 384, 386, 388, 390 and 392 are respectively connected to so-called analog gates 404, 406, 408, 410, 412, 414, 416, 418, 420 and 422 shown in FIGS. 8C and 8D. The voice signals on leads *f, g, h, i, j, k, l, m, n* and *o* from FIG. 8A are connected to the gates 422, 420, 418, 416, 414, 412, 410, 408, 406 and 404, respectively, and the outputs from these gates are connected together to lead *ag* which is connected to amplifier 424 shown in FIG. 8D. The output of the amplifier 424 is connected by lead *c* to the pole 280*e* of the relay 280 shown in FIG. 8A. Since the pole 280*e* is deflected to engage its left contact during a readout, the amplifier 424 output shown in FIG. 8D is connected by lead *d* to output transformer 426 which drives a loudspeaker 428.

Thus, tone signals are provided successively through the suitably positioned wipers 316*a*, 320*a*, 324*a* and 328*a* (FIGS. 8C and 8D) to the inverting inputs of corresponding ones of the "nand" gates 374 through 392, and the even or odd digit control signals from leads *ah* or *ai* are provided as appropriately established to the regular, non-inverting, inputs of the "nand" gates 374 through 392. An inverting input will convert the high tone signal to a low input signal for the associated "nand" gate, and the inverters 400 and 402 (FIG. 8E) will convert high control signals to low ones on leads *ah* and *ai* for proper application to the regular inputs of their respectively associated "nand" gates 374 through 392. High output signals from the "nand" gates 374 through 392 are then produced at the proper times to turn on their respective analog gates 404 through 422 and pass the voice signals on leads *f* through *o* in a suitable sequence to amplifier 424 (FIG. 8D), through deflected relay pole 280*e* (FIG. 8A) and (back) to the loudspeaker 428. The inputs to the inverters 400 and 402 are connected to respective leads *ay* and *az* (FIGS. 8E and 8F) and are dependent upon the conditions of the switches 318, 322, 326 and 330, and the inverted tone signal outputs from the inverters 348, 350, 352 and 354. An inverting input of any of the "nand" gates 374 through 392 is one wherein an additional inverter is actually inserted before a regular input of a "nand" gate which, in the system being described, preferably comprises two transistor amplifiers having respective, regular, inputs and a single, combined, output. However, identical units or modules including four elements in each can be internally connected in any required manner are indicated herein. Accordingly, the "nand" gates 374 through 392 with so-called inverting inputs are representative of one particular internal connection of the identical modules used throughout the manufactured system.

The 10-decade wiper 328*a* (FIG. 8D) is aligned with the corresponding control wiper 330*a* (FIG. 8F). When the wiper 328*a* is centered on its "0" contact, for example, the wiper 330*a* is also centered on its "0" contact. However, when the wiper 328*a* is in the center of the common make-before-break portion of its contacts "9" and "0"; that is, corresponding to a zero indication, the wiper 330*a* is positioned in the center of the small gap between its contacts "9" and "0." A slight decrease or increase from zero would cause the wiper 330*a* to engage the edge of its "9" or "0" contact, respectively. It may be desirable to have the gap between successive contacts of the wiper 330*a* and the width of such wiper 330*a* made as small as permissible. This means that the slightest deviation of the correspondingly aligned wiper 328*a* from its "0," "1," "2," etc. positions (midpoints of their common make-before-break portions) would immediately cause the wiper 330*a* to engage an edge of its corresponding "0," "1," "2," etc. contacts, respectively. Thus, changeovers between the number interface positions would be promptly effected. Of course, the wipers 328*a* and 330*a* are driven 10 times faster than the wipers 324*a*, 326*a* and 326*b* (i.e., making 10 turns exactly for each turn thereof), 100 times faster than the wipers 320*a*, 322*a* and 322*b*, and 1000 times faster than the wipers 316*a*, 318*a* and 318*b*, all moving in precisely related synchronism.

Effectively, when the decade switch wiper 328*a* (FIG. 8D) is positioned on any of its contacts, the control switch wiper 330*a* (FIG. 8F) is positioned on the corresponding one of its contacts. When the wiper 330*a* engages an even contact, transistor 430 is turned on to energize relay coil 432*a*, deflecting the magnetically latching relay pole 432*b* to the left. However, when an odd contact is engaged by wiper 330*a*, transistor 434 is turned on to energize relay coil 432*c*, deflecting the relay pole 432*b* to the right. The relay pole 432*b* is connected to +3 volts through a diode 436. The relay pole 432*b* will remain latched in one position established by the corresponding relay coil until the other relay coil is energized. The left contact of the relay pole 432*b* is connected to the inverting input of "nand" gate 438, and the right contact of the pole 432*b* is connected to the inverting input of "nand" gate 440. The 10-decade tone output of inverter 354 is connected to both of the regular inputs of the gates 438 and 440, and the outputs therefrom are coupled through respective diodes 442 and 444 to leads *ay* and *az* which connect with the inverters 400 and 402 shown in FIG. 8E. The outputs of the inverters 400 and 402 are connected to leads *ah* and *ai*, respectively, which connect with the regular inputs of "nand" gates 374 through 392 shown in FIGS. 8C and 8D. In the 100-decade, 1000-decade and 10000-decade control stages in FIGS. 8E and 8F, their respective transistors 446, 448 and 450 correspond to the transistor 430, relays 452, 454 and 456 to the relay 432, transistors 458, 460 and 462 to the transistor 434, diodes 464, 466 and 468 to the diode 436, gates 470, 472 and 474 to the gate 438, gates 476, 478 and 480 to the gate 440, diodes 482, 484 and 486 to the diode 442, and diodes 488, 490 and 492 to the diode 444.

It is noted that the diodes 346 or 338 shown in FIG. 8F prevent the connection of the +3 volts on wiper 330*a* to the next decade wipers 326*a* or 326*b*, respectively, except when the wiper 330*a* engages, its "0" or "9" contact. However, when the wiper 330*a* engages, for example, one of its odd contacts, say "7," the relay pole 432*b* is deflected to engage its right contact such that +3 volts will be applied to the inverting input of gate 440. When the 10-decade tone signal appears on lead *s*, a low output is obtained from the inverter 354 and applied to both regular inputs of the gates 438 and 440. A high output is only obtained from the "nand" gate 440, and passes through diode 444 to lead *az* which is connected to inverter 402 in FIG. 8E. A low output is then produced from the inverter 402 on lead *ai* which is connected to the regular inputs of the odd digit "nand" gates 374 through 392 shown in FIGS. 8C and 8D. The low output from the inverter 354 is also applied to lead *aw* which is connected to inverter 366 in FIG. 8D, and a high output is produced which is connected to wiper 328*a* through the diode 370. The wiper 328*a* would, of course, be positioned on the same "7" contact as was assumed for wiper 330*a*. The "7" contact of decade switch 328 is connected only to the inverting input of the "nand" gate 380 (FIG. 8C) which also has its other input properly energized by the low signal on lead *ai*. Thus, a high output signal is produced from the gate 380 and energizes the analog gate 410 at the correct time to pass the voice signal on lead *l* from the proper "7" readout head 306 (FIG. 8A) into the lead *ag* and amplified by amplifier 424 (FIG. 8D) for reproduction by the loudspeaker 428. The wiper 328*a* could be engaging both the "6" and "7" contacts or the "7" and "8" contacts if it is stopped on the common make-before-break portions of these pairs of adjacent contacts. This does not matter, however, since only the odd digit control lead *ai* is properly energized.

A similar action occurs for the other decade stages according to certain conditions of their preceding stages. Returning to FIG. 8F, it is only when the wiper 330*a* engages its "9" contact that the lagging wiper 326*b* is energized by +3 volts. In like manner, only when the wiper 330*a* engages its "0" contact is the leading wiper 326*a* energized. Assuming that the altitude of the aircraft bearing this system is generally increased such that the decade wiper 324*a* (FIG. 8D) moves from its "5" contact into the make-before-break portion of the next "6" contact, the wipers 326*a* and 326*b* would be engaging their "6" and "5" contacts, respectively, as shown in FIG. 8F. This condition will still prevail as the wiper 330*a* moves to its "9" contact and then its "0" contact, as would be the case for an increasing number. The effect is that first the odd contact "5" and then the even contact "6" would be energized by the action of the moving wiper 330*a*, and the relay 452 would be left latched for the last, even condition which, of course, correctly corresponds to the larger "6" digit even though the wiper 324*a* is engaging both the "5" and "6" contacts in their common make-before-break contact portions. Reversing the movement would cause the wiper 330*a* to engage its "0" contact first and then its "9" contact last so that the relay 452 would be left latched for the last, odd condition correctly corresponding to the smaller "5" digit, for a decreasing number. It is to be remembered, however, that the wipers of the decade switches 316, 320, 324 and 328 and the control switches 318, 322, 326 and 330 are all stopped during a readout.

Generally, the wipers 326*a* and 326*b* FIG. 8F) engage their respective contacts "6" and "5", for example, con tinuously as the wiper 324*a* (FIG. 8D) traverses the com mon make-before-break portion of its "6" and "5" contacts. This common, make-before-break portion can be sufficiently long to cover a distance adequately beyond the necessary range on both sides of its center point which is the starting point of the "6" digit. That is, one of the make-before-break portions of the decade switch 324 could, for example, cover a range corresponding to that extending between the "8" contact through to the "2" contact of the switch 330 (FIG. 8F), and not just between the "9" contact through to the "1" contact or even somewhat less. The longer or wider range is permissible because it is only when the wiper 330*a* engages its "0" or "9" contact can the wiper 326*a* or 326*b* (or those of any higher decade stage) be energized to actuate the relay 452 (or the higher decade stage relays 454 or 456). In order that the higher decade wipers 322*a* or 322*b* (FIG. 8E) can be energized, the wiper 330*a* must be engaging its "0" or "9" contact and the wiper 326*a* or 326*b* must also be engaging their "0" or "9" contact. Where the 1000-decade switch wiper 320*a* (FIG. 8C) is just on the "5" digit interface and decreases into the "4" digit area, for example, this wiper 320*a* will be moving in the common make-before-break portion of its "5" and "4" contacts. The hundreds control wiper 326*a* would be successively engaging its "0" contact, then its "9" and "8" contacts as the wiper 326*b* engages its "9," then its "8" and "7" contacts. At the same time, the tens control wiper 330*a* engages its "0", "9", "8", etc. contacts successively for two complete cycles.

When the wiper 330*a* engages its "0" contact, the wiper 326*a* engaging its "0" contact correctly energizes wiper 322*a* on its "5" contact. As the wiper 330*a* moves into engagement with its "9" contact, wiper 326*b* engaging its "9" contact correctly energizes the wiper 322*b* on its "4" contact to actuate relay 454 to its even digit condition. Of course, the relay 452 is also then correctly actuated to its odd digit condition. Continuing with the wiper 330*a* to its "8" contact, the diode 346 blocks any voltage to wiper 326*a* so that the relay 454 remains correctly actuated in its last condition previously produced by the energized wiper 322*b*. After the first cycle of wiper 330*a*, the wiper 326*a* engages its "9" contact and the wiper 326*b* engages its "8" contact. The wiper 330*a* then on its "0" contact energizes wiper 326*a* engaging its "9" contact which is connected to wiper 322*b* but this does not alter the relay 454 condition. When the wiper 330*a* engages its "9" contact, the wiper 326*b* on its "8" contact actuates relay 452 correctly to its even digit condition. The diode 344, however, blocks energization of the wiper 322*a* engaging its "5" digit. After the second cycle of wiper 330*a*, wiper 326*a* engages its "8" contact and wiper 326*b* engages its "7" contact. As the wiper 330*a* engages its "0" then "9" contact, the last "9" contact energizes the wiper 326*b* engaging its "7" contact to actuate the relay 452 correctly to an odd digit condition. Diodes 336 and 344 block any further energization of the wipers 322*a* and 322*b*. Thus, the relays 452 and 454 are correctly actuated at all times. A similar process, of course, occurs in the remaining stages.

Figure 8G:
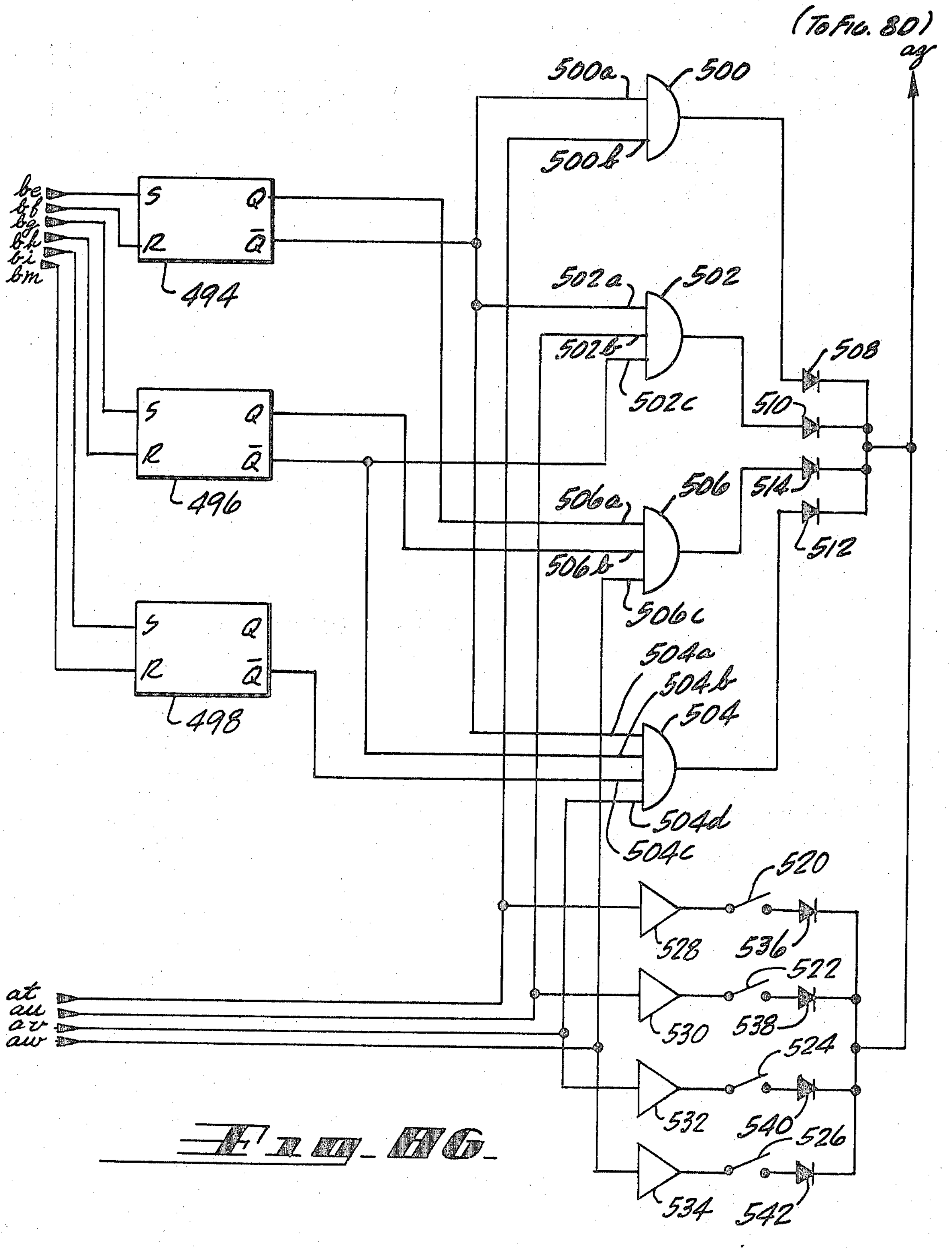

The "0" contacts of switches 318, 322 and 326 (FIGS. 8E and 8F) are connected to respective leads *be, bg* and *bi* which are, in turn, connected to the set "S" inputs of set and reset flip-flops 494, 496 and 498 shown in FIG. 8G. When the decade switches 316, 320 and 324 (FIGS. 8C and 8D) are each positioned in its zero digit condition, the wipers 318*a*, 322*a* and 326*a* (FIGS. 8E and 8F) engage their respective "0" contacts and the wipers 318*b*, 322*b* and 326*b* engage their respective "9" contacts. Thus, when the wiper 330*a* engages its "0" contact, the flip-flops 494, 496 and 498 are placed in a set condition which produces a "high" signal on the "Q" outputs and a "low" signal on the complementary $\overline{Q}$ outputs. Low signals are accordingly applied to input 500*a* of "nand" gate 500, inputs 502*a* and 502*c* of "nand" gate 502, and inputs 504*a*, 504*b* and 504*c* of "nand" gate 504. High signals, however, are applied to inputs 506*a* and 506*b* of the "nand" gate 506. When the 10000-decade tone signal appears on lead *p* (FIG. 8A), a low signal is produced from inverter 348 (FIG. 8E) to lead *at* which is connected to the input 500*b* of gate 500. A high output signal is then produced from the gate 500 through diode 508 to lead *az*. Similarly, when the 1000-decade and 100-decade tone signals appear on leads *q* and *r*, low signals appear on leads *au* and *av*, respectively, so that high output signals are produced from the gates 502 and 504 through diodes 510 and 512 to the lead *az*. These output signals are blanking signals corresponding to the zero digit conditions of the decade switches 316, 320 and 324.

The lead *az* is connected to the base of a transistor 516 shown in FIG. 8D. The high signal thereon energizes relay 518 and actuates its pole 518*a* so that it is grounded. The pole 518*a* is connected to lead *c* which is connected by lead *d* to output transformer 426 through relay pole 280*e* (FIG. 8A) engaging its left contact. Thus, the output of amplifier 424 and the input of the transformer 426 are grounded by pole 518*a* to prevent any output from the loudspeaker 428. Selective manual blanking of the different decade stage outputs can also be accomplished by closing any one or combination of the switches 520, 522, 524 and 526 shown in FIG. 8G. The 10000-decade inverted tone (low) signal on lead *at* is connected to inverter 528. Similarly, the 1000-decade, 100-decade and 10-decade inverted (low) tone signals on leads *au, av* and *aw* are connected to inverters 530, 532 and 534, respectively. When the switches 520, 522, 524 and 526 are closed and the low tone signals are present, the inverters 528, 530, 532 and 534 produce high output signals through respective diodes 536, 538, 540 and 542 to the lead *az* which is connected to the base of the transistor 516. The base of the transistor 516 is further connected to lead *e* through diode 544. The lead *e* is, in turn, connected to +3 volts on lead 288 (FIG. 8A) through a switch 546. When the switch 546 is closed, the transistor 516 is turned on which energizes the relay 518 to turn off the audio or voice output from the system. When the system is on and the switches 520, 522, 524 and 526 are open, the inverters 528, 530, 532 and 534 (like those used throughout the system and any indicated within the "nand" gates) have either low or high output signals when their respective inputs are either high or low.

Returning to FIGS. 8E and 8F, the "1" contacts (odd contacts) of the control switches 318, 322 and 326 are connected to respective leads *bf, bh* and *bm* which are, in turn, connected to the reset "R" inputs of the flip-flops 494, 496 and 498 shown in FIG. 8G. Reset of the inverter 498 can occur when the wiper 330*a* engages its "0" or "9" contact and their respectively connected wipers 326*a* or 326*b* engage an odd contact of the switch 326. Reset just after setting of the inverter 498, which setting takes place at zero indication of the 100-decade switch wiper 324*a*, is produced when wiper 330*a* is decreasingly moved to its "9" contact. This energizes the wiper 326*b* engaging its "9" contact which is an odd numbered contact. Reset can also occur when the wiper 324*a* moves to an increasing digit indication of 101 or 102, for example, since the wiper 330*a* has traveled a complete cycle to be engaging its "0" contact and the wiper 326*a* connected to such contact would now be engaging its "1" contact which is an odd numbered contact. Thus, reset is accomplished in either direction from the zero indication position of the wiper 324*a* although reset in the increasing number direction is accomplished approximately one cycle (of wiper 330*a*) later than in the decreasing direction. It is, of course, necessary that reset occur promptly in a decreasing condition from a zero indication of the wiper 324*a* since the indicated decade stage number could be changed from, say, 1000 to 999 or 998 which involves the next higher decade switch 320. On the other hand, reset after approximately one full cycle of the wiper 330*a* is of no consequence with an increasing number from zero indication of the decade switch 324 since ten complete cycles of the wiper 330*a* are required before the next higher decade switch 320, changing from a zero to 1000 indication, need be involved. A generally similar operation applies, of course, between the other, higher, decade stages.

The 10-decade switch 328 indicated in FIG. 8D can be generally constructed to cooperate with the switch 330 of FIG. 8F such that the switch 328 gives accurate position representation to within one or two feet, for example. That is, a zero indication is produced for switch 328 representations from about 1 to 11 feet, a "10" inidication from about 11 to 21 feet, a "20" indication from about 21 to 31 feet, etc. In a decreasing condition, a "30" indication changes back to a "20" indication and remains so from representations of about 29 to 19 feet, a "10" indication from about 19 to 9 feet, and a "0" indication from about 9 to —1 feet (as from 409 to 399 feet). The foregoing follows from the fact that gaps are necessary to separate the contacts of the control switch 330, even though such gaps are made as small as possible. Of course, the system only announces altitude readings spaced by ten feet intervals, at least, and even then it may be desirable to blank out the 10-decade readings above 1000 feet. Thus, in FIG. 8G, the "high" signals on the inputs 506*a* and 506*b* when the flip-flops 494 and 496 are set as a result of zero indications of the decade switches 316 and 320 (FIG. 8C), become "low" signals when these flip-flops 494 and 496 are reset. This means that when the switches 316 and 320 are not at zero, the inputs 506*a* and 506*b* have low signals applied thereto. When the low 10-decade tone signal on lead *aw* appears, a high signal is produced at the output of gate 506 and passed through diode 514 to lead *az* and transistor 516 (FIG. 8D). Accordingly, the voice signals for the 10-decade tone intervals are blanked out for altitudes above 1000 feet. It might also be noted that the 100-decade flip-flop 498 has been reset at the altitude indication of 101 or 102 feet illustratively mentioned above, and such altitude indication is well below 1000 feet where blanking of the 10-decade reading is begun.

At the end of a cycle of operation, or after a readout, the tone signal from the auto-stop readout head 306 shown in FIG. 8A is produced and applied to amplifier 548. This energizes relay 550 which connects +24 volts to relay coil 280*f* of the magnetically latching relay 280. This will return the relay poles 280*b*, 280*c*, 280*d* and 280*e* back to engage their respective right contacts. The relay pole 280*b* breaks the circuit to motor 302 stopping the tape drive 304. The pole 280*c* closes the circuit to clutch brake 298 and the pole 280*d* closes the circuit to synchro receiver 296. The clutch portion of clutch brake 298 is engaged as its brake portion is simultaneously released. This permits the servomotor 292 to drive gearing 300 through the engaged clutch portion and quickly position the output shafts *ba*, *bb*, *bc* and *bd* to a condition established by the output of the synchro receiver 296, corresponding to the instantaneous altitude of the aircraft mounting the system. The rotor of the synchro receiver 296 is re-positioned by the gearing 300 driven by servomotor 292 to agree with the orientation of the altitude-positioned rotor of the synchro transmitter such that the ouputs of the synchro receiver 296 and servo amplifier 294 are reduced to zero or nulled whereby the wipers 316*a*, 320*a*, 324*a* and 328*a* (FIGS. 8C and 8D) are always positioned in accordance with the altitude of the aircraft as indicated by its altimeter.

Automatic readout to provide a voice warning or announcement at a selected altitude and, if desired, at certain altitudes above and below the selected altitude can be performed through the system by placing the switch 278 of FIG. 8A in its automatic warning position "auto" which engages the poles 278*a*, 278*b* and 278*c* with their respective right contacts. In this position, +3 volts is connected to inverter 552 which then provides a "low" signal to one input 554*a* of "nand" gate 554. The other input 554*b* is an inverting input and is connected to lead *a*. When the inputs 554*a* and 554*b* have low and high input signals respectively applied thereto, a "high" output signal is then provided to the transistor 312 to turn on the same and energize the relay 314. When the relay 314 is actuated, the relay coil 280*a* is energized to actuate the relay 280 and produce a readout as described before. The pole 278*c* of the selector switch 278 is connected to +24 volts on lead 290, and the right contact of the pole 278*c* is connected to lead *b*. Thus, +24 volts is connected to lead *b* when the switch 278 is placed in its automatic warning position "auto."

The lead B connects with a pulse oscillator 556 shown in FIG. 8B, to supply and energize the same. The output rate of the oscillator 556 is, for example, 40 pulses per second and these pulses are applied to trigger input T of flip-flop 558. The output Q of the flip-flop 558 is connected to the trigger input T of another flip-flop 560. The output Q of flip-flop 560 is connected to one input of each of the "nand" gates 562 and 568. The output $\overline{Q}$ of flip-flop 560 is connected to one input of each of the "nand" gates 564 and 566. Similarly, the output Q of flip-flop 558 is connected to the other inputs of gates 564 and 568, and its output $\overline{Q}$ is connected to the other inputs of gates 562 and 566. The flip-flops 558 and 560, and the gates 562 through 568 are connected in a ring counter such that a "high" signal is produced successively from the outputs of the gates 562 through 568. The high output signals are, of course, produced at the outputs of the gates 562 through 568 in succession at the pulse rate of the oscillator 556. The output of gate 562 in connected through diode 570 to inverter 572 and lead *ad*. Similarly, the output of gate 564 is connected through diode 574 to inverter 576 and lead *ae*, and the output of gate 566 is connected through diode 578 to inverter 580 and lead *af*. The output of the gate 568 is connected to the reset inputs R of three set and reset flip-flops 582, 584 and 586. The set inputs S of the flip-flops 852, 584 and 586 are connected to respective outputs of "nand" gates 588, 590 and 592. One input of each of the gates 588, 590 and 592 is connected to the respective outputs of the inverters 572, 576 and 580. The $\overline{Q}$ outputs of the flip-flops 582, 584 and 586 are connected to respective inputs of "nand" gate 594 which has its output connected to lead *a* connecting with the inverting input 554*b* of gate 554 (FIG. 8A).

A thumb-wheel settable switch 596 shown in FIG. 8B is preferably located in the cockpit of the aircraft bearing this system and includes three decade switch portions each having a wiper and ten associated contacts. The wiper 596*a* of the 10000-decade switch portion is connected to inverter 598, wiper 596*b* of the 1000-decade portion is connected to inverter 600 and wiper 596*c* is connected to inverter 602. The outputs of the inverters 598, 600 and 602 are connected to the other inputs, respectively, of the gates 588, 590 and 592. The "1" contacts of the three decade switch portions are connected together and, in like manner, the other contacts are tied together as illustrated. The leads *as, ar, aq, ap, ao, an, am, al, ak* and *aj* (FIG. 8C) connect with the "1" trhough "0" contacts, respectively, of the decade switches 316, 320, 324 and 328. These leads, in the order just named, connect with the leads *t, u, v, w, x, y, z, aa, ab* and *ac* which are connected to the "1" through "0" contacts, respectively, of the decade switch portions of the thumb-wheel switch 596 through separate diodes 604, 606, 608, 610, 612, 614, 616, 618, 620 and 622 (FIG. 8B). The wiper 596*a* is shown having two extra wipers indicated in broken lines connected thereto. The extra wipers can be pressed down when desired into position to engage the contacts ("2" and "4") preceding and following the one ("3") being engaged by the wiper 596*a*. Either one or both of the extra wipers can be selectively put into position for use to provide additional readouts above and/or below the one selected for warning or announcement. More than the two extra wipers can be provided for selective engagement with the other contacts, and the two extra ones indicated are representative of any number of extra wipers for the different contacts. Thus, by providing extra wipers for all of the contacts of each decade switch portion, readouts can be obtained at regular intervals throughout the altitude range encompassed by the three decade switch portions.

The leads *ad*, *ae* and *af* of FIG. 8B connect with respective wipers 316*a*, 320*a* and 324*a* (FIGS. 8C and 8D) of the 10000-decade, 1000-decade and 100-decade switches 316, 320 and 324. Accordingly, successive "high" pulse signals are applied to the wipers 316*a*, 320*a* and 324*a* and are suitably connected to corresponding ones of the leads *t, u, v, w, x, y, z, aa, ab* and *ac* as established by the instantaneous positions of the driven wipers 316*a*, 320*a* and 324*a*. High output signals will then be connected to certain contacts of the thumb-wheel switch 596 (FIG. 8B) and, if the setting of the wipers 596*a*, 596*b* and 596*c* are the same as the instantaneous positions of the wipers 316*a*, 320*a* and 324*a*, respectively, then the high signals will produce appropriate low output signals from the inverters 598, 600 and 602 at the same corresponding times that the high signals from gates 562, 564 and 566 will produce appropriate low signals from the inverters 572, 576 and 580. Thus, three successive high output signals from gates 588, 590, and 592 would set the flip-flops 582, 584 and 586 and provide three low input signals to the gate 594 which then produces a high output signal on lead *a*. Lead *a* is connected to the inverting input 554*b* (FIG. 8A) of gate 554 which then, when the switch 278 is in the "auto" position or condition, produces a high output signal to turn on the transistor 312 and actuate the relay 314. This will, of course, operate the magnetically latching relay 280 and produce a readout in the regular manner described before. Automatic readouts (formations of a composite message) at selected values or conditions of the digital number (symbolic) representation or positions of the wipers 316*a*, 320*a* and 324*a* are thus obtained by making suitable thumb-wheel switch 596 settings. The pulse from the gate 568 (FIG. 8B) following the output pulse from gate 566 resets the flip-flops 582, 584 and 586 to change the high output signal from the gate 594 back to a low one. It is noted that while 10000-decade, 1000-decade and 100-decade tone signals are connected to the thumb-wheel switch 596 during a readout, these tones are derived from much longer duration signals recorded on tape and would not be in synchronism with the successive (40 pulses per second) output signals from the gates 562, 564 and 566 to set all three flip-flops 582, 584 and 586 before any resetting thereof by the output signal from gate 568.

Figure 9:
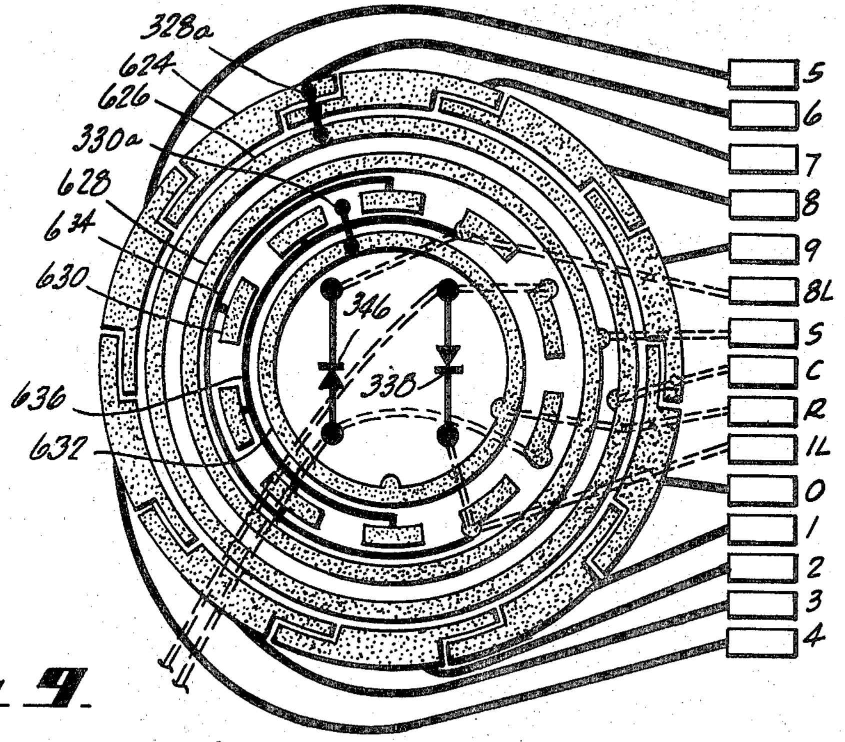
FIG. 9 is a front elevational view of the lowest stage switch device which includes the lowest decade and control switches used in the invention version shown in FIGS. 8A through 8G.

FIG. 9 is generally a front elevational view of an illustrative embodiment of the 10 decade switches 328 and 330 shown schematically in FIGS. 8D and 8F. This view is essentially similar to the front face view of an assembled device including printed circuit board 234 and rotor disc 236 shown in FIG. 4, where the board 234 and its mating front disc 236 are transparent. The switch 328 comprises the first outer ring 624, second ring 626 and wiper 328*a*. The ring 624 has conductive make-before-break segment contacts, and the conductive ring 626 is continuous as shown. The rings 624 and 626 are concentric and formed on a (transparent) board similar to the board 234 of FIG. 4. The wiper 328*a* engages the rings 624 and 626, and is suitably mounted to a (transparent) disc similar to the disc 236. The disc mounting the wiper 328*a* is rotatably driven by shaft *bd* indicated in FIGS. 8A and 8D. The third conductive ring 628 is not used in the 10-decade stage.

The switch 330 comprises the fourth ring 630, the fifth ring 632 and wiper 330*a*. The ring 630 has ten segment contacts which are separated by short gaps, and the odd and even (alternate) contacts are connected together by printed leads 634 and 636, respectively. Printed leads on the front surface of the board are shown in solid lines, and those on the back surface are shown in broken lines. The wiper 330*a* engages rings 630 and 632, and is suitably mounted to the front (transparent) disc which also mounts the wiper 328*a*. Diodes 338 and 346 are shown mounted to the (transparent) board on which is formed all of the five concentric rings 624, 626, 628, 630 and 632. The wiper 328*a* is shown in FIG. 9 positioned at an interface point representative of a digit indication of 70. Moving clockwise from this point, the wiper 330*a* will engage an odd "7" contact segment of ring 630 whereas an even "6" contact segment is engaged when the wiper 330*a* is moved counterclockwise from the interface position. Thus, it is apparent that the gaps between contact segments of the ring 630 should be just wide enough to prevent bridging of any two adjacent segments by the width of the wiper 330*a*. Actually, however, the gaps need not be particularly narrow since such accuracy is not commensurate with the available accuracy of the altitude input data (altimeter accuracy), in aircraft usage.

Figure 10:
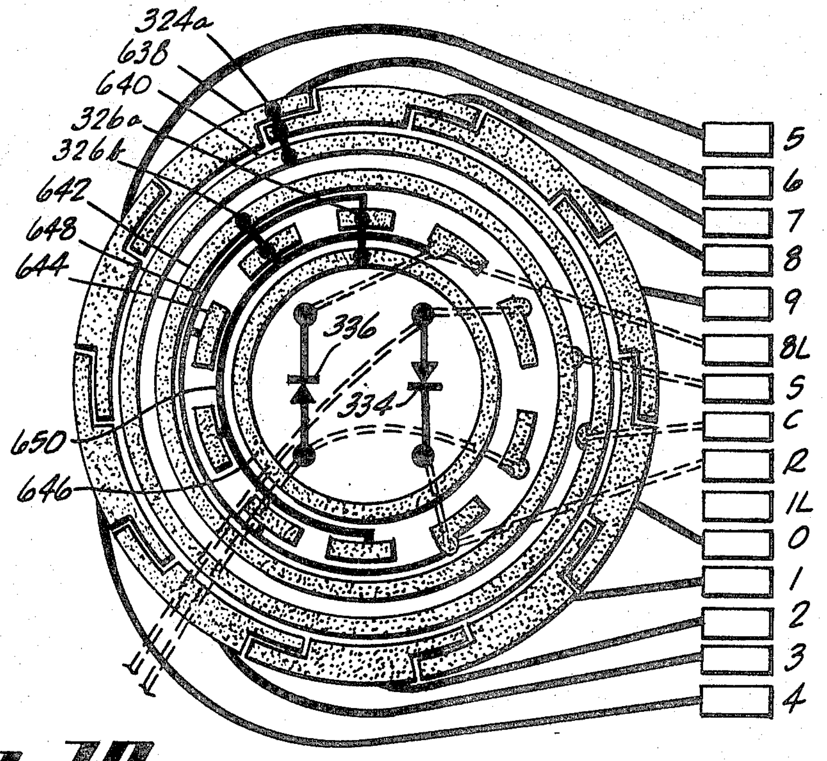
FIG. 10 is a front elevational view which is similar to that of FIG. 9, showing a higher stage switch device including its higher decade and control switches which are used also in the invention version shown in FIGS. 8A through 8G.

FIG. 10 is a front elevational view similar to that of FIG. 9 of the 100-decade switches 324 and 326 (FIGS. 8D and 8F). The other, higher, decade switches can be identical to that shown and need not be illustrated. From FIGS. 9 and 10, it can be readily seen that both devices are the same except for the use of one control wiper 330*a* in FIG. 9 and two control wipers 326*a* and 326*b* in FIG. 10. The switch 324 comprises the first outer ring 638, second ring 640 and wiper 324*a*. The switch 326, however, comprises the third, fourth and fifth rings 642, 644 and 646, and wipers 326*a* and 326*b*. The wiper 326*a* engage rings 644 and 646 while the wiper 326*b* engage rings 642 and 644. The wiper 326*a* is positioned ahead (clockwise) of the wiper 324*a* whereas wiper 326*b* is positioned behind (counterclockwise) of the wiper 324*a*. In the position shown in FIG. 10, the wiper 324*a* engages both the "6" and "7" contacts of ring 638 as the wiper 326*a* engages the "7" contact of the ring 644 and wiper 326*b* engages the "6" contact thereof. When the wiper 324*a* is rotated to the center of the "7" contact of ring 638, it can be seen that the wiper 326*a* will be positioned in the gap between the "7" and "8" contacts of the ring 644 and the wiper 326*b* will be positioned in the gap between the "6" and "7" contacts thereof. The odd contacts of ring 644 are connected together by printed lead 648, and the even contacts are connected together by printed lead 650. Diodes 336 and 344 can be mounted on the circuit board as shown.

While certain exemplary embodiments of my invention have been described above and shown in the accompanying drawings, it is to be understood that the described embodiments are merely illustrative of, and not restrictive on, the board invention and that various changes in design, structure and arrangement may be made in the disclosed embodiments of my invention without departing from the spirit and scope of the invention.

What is claimed is:

1. An annunciator system comprising:

means including a plurality of channels each containing multiple message elements therein;

means responsive to a changeable parameter for providing a symbolic representation which is variable in accordance with said parameter, said symbolic representation defining a sequence of symbols arranged in progressive orders and variable according to said symbolic representation, and wherein each particular symbol and its order identify a corresponding message element in a corresponding one of said channels; and
operable means responsive to said symbolic representation for forming a composite message from said identified message elements of said identified channels.

2. The invention as defined in claim 1 including means for providing automatic formations of said composite message at selected symbol sequences of said symbolic representation.

3. The invention as defined in claim 1 including means for blanking out at least one message element portion of said composite message when said blanking means is operated, said blanking means comprising an automatically operable device for blanking out at least one message element portion of said composite message and a manually operable device for blanking out at least one message element portion of said composite message.

4. The invention as defined in claim 1 including means for preventing the formation of ambiguous composite messages in said annunciator system whereby deliverance of such messages is precluded therefrom.

5. An annunciator system comprising:
means including a plurality of channels containing respective message elements therein;
means responsive to a changeable parameter for providing a symbolic representation which is variable in accordance with said parameter, each symbol of said symbolic representation identifying a corresponding one of said channels; and
operable means responsive to said symbolic representation for forming a composite message from said message elements of said identified channels,
wherein said channels each includes multiple message elements therein, said symbolic representation is a multiple order digital number in which each digit identifies a corresponding one of said channels according to its digit value and the order of said digit identifying a corresponding one of said message elements therein, and said operable means is responsive to said digital number to form a composite message from said identified channels and message elements.

6. The invention as defined in claim 5 including means for blanking out at least one message element portion of said composite message when said blanking means is operated.

7. The invention as defined in claim 5 including means for preventing the formation of ambiguous composite messages therefrom.

8. The invention as defined in claim 5 wherein said operable means is arbitrarily operable to produce said composite message at any chosen time.

9. The invention as defined in claim 5 wherein said operable means is continuously operable to produce successive formations of said composite message continuously.

10. The invention as defined in claim 5 including means for providing automatic formations of said composite message at selected values of said digital number.

References Cited

UNITED STATES PATENTS

| | | | |
|---|---|---|---|
| 3,412,215 | 11/1968 | Rawley | 179—100.2 |
| 3,344,239 | 9/1967 | Ragland | 179—100.3 |
| 3,141,069 | 7/1964 | Lithey | 179—100.1 |

BERNARD KONICK, Primary Examiner

J. ROSENBLATT, Assistant Examiner

U.S. Cl. X.R.

340—221

PO-1050
(5/69)

UNITED STATES PATENT OFFICE
CERTIFICATE OF CORRECTION

Patent No. 3,538,264 Dated November 3, 1970

Inventor(s) William D. Van Dyke

It is certified that error appears in the above-identified patent and that said Letters Patent are hereby corrected as shown below:

Column 4, line 21, "116d will" should read --116d. When the relay coil 116e is subsequently energized at the end of a cycle, the poles 116b, 116c and 116d will--. Column 14, line 58, "increased" should read --increasing--. Column 15, line 6, "FIG.8F)" should read --(FIG. 8F)--. Column 18, line 66, "trhough" should read --through--.

Signed and sealed this 9th day of January 1973.

(SEAL)
Attest:

EDWARD M.FLETCHER,JR.
Attesting Officer

ROBERT GOTTSCHALK
Commissioner of Patents